United States Patent
Li

(10) Patent No.: US 11,838,932 B2
(45) Date of Patent: Dec. 5, 2023

(54) METHOD AND APPARATUS FOR CONFIGURING GUARD PERIOD

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 444 days.

(21) Appl. No.: 17/271,571

(22) PCT Filed: Aug. 28, 2018

(86) PCT No.: PCT/CN2018/102744
§ 371 (c)(1),
(2) Date: Feb. 25, 2021

(87) PCT Pub. No.: WO2020/041978
PCT Pub. Date: Mar. 5, 2020

(65) Prior Publication Data
US 2021/0195580 A1 Jun. 24, 2021

(51) Int. Cl.
*H04W 72/51* (2023.01)
*H04L 5/00* (2006.01)
(Continued)

(52) U.S. Cl.
CPC .......... *H04W 72/51* (2023.01); *H04L 5/0053* (2013.01); *H04W 72/0446* (2013.01);
(Continued)

(58) Field of Classification Search
CPC . H04L 9/08; H04L 5/00; H04L 1/0041; H04L 5/83; H04L 5/0044; H04L 27/2646;
(Continued)

(56) References Cited

U.S. PATENT DOCUMENTS 7,821,917 B2 * 10/2010 Malladi et al. ............... 370/210
7,860,076 B2 * 12/2010 Stanwood .................... 370/348
(Continued)

FOREIGN PATENT DOCUMENTS

CN   101056151 A   10/2007
CN   101669290 A   3/2010
(Continued)

OTHER PUBLICATIONS

Katsushi: Automatic Receiver Gain Control Method; JP 2730347 B2 (Year: 1998).*
(Continued)

*Primary Examiner* — Meless N Zewdu
(74) *Attorney, Agent, or Firm* — SYNCODA LLC; Feng Ma

(57) ABSTRACT

A method for configuring a guard period includes: determining a target guard duration value corresponding to a guard period; and when data burst transmission is to be performed, sending target data of the data burst transmission to a receiver in the Internet of Vehicles starting from a first time point, where the first time point is a time point having an interval of the target guard duration value from a start time point, and the start time point is a time point at which the data burst transmission is determined to be performed. A guard period can be placed before sending target data, and a number of valid symbols in a subframe for data transmission can be increased by controlling a target guard duration value corresponding to the guard period, reducing performance loss of a terminal and improving performance in the Internet of Vehicles.

17 Claims, 17 Drawing Sheets

(51) Int. Cl.
*H04W 72/0446* (2023.01)
*H04W 72/30* (2023.01)
*G16Y 10/70* (2020.01)
*H04W 84/00* (2009.01)

(52) U.S. Cl.
CPC .............. *H04W 72/30* (2023.01); *G16Y 10/70* (2020.01); *H04W 84/005* (2013.01)

(58) Field of Classification Search
CPC .. H04L 27/2666; H04W 72/00; H04W 72/04; H04W 5/0053; H04W 72/51; H04W 72/0446; H04W 84/005; H04W 72/30; H04W 84/06; H04W 80/00; H04W 80/04; H04W 88/02; H04W 88/00; H04W 4/46; H04W 4/50; H04W 4/38; H04W 4/21; H04W 4/02; H04W 76/28; H04W 76/15; H04W 76/11; H04W 76/00; H04W 76/10; H04W 4/44; H04W 88/18; H04W 88/08; H04W 4/40; H04W 4/42; H04W 4/48; H04W 24/00; H04W 24/02; H04W 24/04; G16Y 10/70; G16Y 40/10; G16Y 40/30; G16Y 40/35; G16Y 40/50; G16Y 40/60; G06F 9/30072
See application file for complete search history.

(56) References Cited

U.S. PATENT DOCUMENTS

| | | | |
|---|---|---|---|
| 11,483,823 B2* | 10/2022 | Gao et al. | H04W 72/0446 |
| 2011/0286370 A1* | 11/2011 | Tang et al. | 370/280 |
| 2015/0120087 A1* | 4/2015 | Duan et al. | H04L 67/12 |
| 2015/0181583 A1* | 6/2015 | Siomina et al. | H04W 72/044 |
| 2016/0254875 A1* | 9/2016 | Gupta | H04J 3/0658 |
| 2016/0360524 A1 | 12/2016 | Blasco Serrano et al. | |
| 2017/0295589 A1* | 10/2017 | Sundarajan et al. | H04W 72/1215 |
| 2017/0325098 A1* | 11/2017 | Kwan et al. | H04W 16/14 |
| 2017/0325225 A1* | 11/2017 | Dinan | H04W 72/0446 |
| 2018/0234967 A1 | 8/2018 | Kim et al. | |
| 2019/0150170 A1* | 5/2019 | Park et al. | H04W 72/1268 |
| 2020/0014523 A1* | 1/2020 | Huang et al. | H04L 5/0092 |
| 2020/0267710 A1 | 8/2020 | Zhang et al. | |
| 2020/0413290 A1* | 12/2020 | Yang et al. | H04W 28/06 |

FOREIGN PATENT DOCUMENTS

| | | |
|---|---|---|
| CN | 101822014 A | 9/2010 |
| CN | 102143119 A | 8/2011 |
| CN | 103402261 A | 11/2013 |
| CN | 103686985 A | 3/2014 |
| CN | 104144518 A | 11/2014 |
| CN | 105472722 A | 4/2016 |
| CN | 104125631 B | 9/2017 |
| CN | 107465507 A | 12/2017 |
| CN | 107667564 A | 2/2018 |
| EP | 3522651 A1 | 8/2019 |
| WO | 2014173207 A1 | 10/2014 |
| WO | 2016204592 A1 | 12/2016 |
| WO | 2018030949 A1 | 2/2018 |
| WO | 2018038565 A1 | 3/2018 |
| WO | 2018058922 A1 | 4/2018 |

OTHER PUBLICATIONS

Srinivasan: Methods and Apparatus for Configuring TDD Operation of a Narrowband Internet of Things Communications System; WO 2019037913 A1 (Year: 2019).*
Ma et al., (CN 106965649 A), An Intelligent Vehicle Terminal Based On Internet Of Things Of (see title) (Year: 2017).*
State Intellectual Property Office of the People's Republic of China, Office Action and Search Report Issued in Application No. 201880001862.2, dated May 31, 2021, 10 pages.
European Patent Office, Extended European Search Report Issued in Application No. 18931997.3, dated Aug. 2, 2021, Germany, 9 pages.
ISA State Intellectual Property Office of the People's Republic of China, Written Opinion of the International Searching Authority Issued in Application No. PCT/CN2018/102744, dated Apr. 10, 2019, WIPO, 9 pages.
Mitsubishi Electric, "Guard periods and timing for DL backhauling in Type 1 relays", 3GPP TSG RAN WG1 #60bis meeting, Beijing, China, R1-102239, Apr. 12-16, 2010, 5 pages.
State Intellectual Property Office of the People's Republic of China, Office Action and Search Report Issued in Application No. 201880001862.2, dated Oct. 29, 2020, 23 pages, (Submitted with Machine Translation).
ISA State Intellectual Property Office of the People's Republic of China, International Search Report Issued in Application No. PCT/CN2018/102744, dated Apr. 10, 2019, WIPO, 4 pages.
Ericsson, "L1 Format for V2V Transmissions using Sidelink", 3GPP TSG RAN WG1 Meeting #84bis, Busan, South Korea, R1-162825, Apr. 11-15, 2016, 4 pages.
Ericsson, "Half-symbol transmission for AGC and GP", 3GPP TSG RAN WG1 Meeting #88bis, Spokane, USA, R1-1705939, Apr. 3-7, 2017, 2 pages.

* cited by examiner

AGC: Automatic Gain Control
DMRS: Demodulation Reference Signal
GP: Guard Period

METHOD AND APPARATUS FOR CONFIGURING GUARD PERIOD

CROSS-REFERENCE TO RELATED APPLICATIONS

The present application is a national stage of International Application No. PCT/CN2018/102744 filed on Aug. 28, 2018, the disclosure of which is hereby incorporated by reference in its entirety.

TECHNICAL FIELD

The present disclosure relates to the field of communications, and in particular, to a method and an apparatus for configuring a guard period.

BACKGROUND

In the related art, a communication standard development on a PC5 interface (a direct communication interface) of V2X (Vehicle to Everything) is based on D2D (device to device), and uses a broadcast type of communication, where information is broadcast from a single vehicle to multiple vehicles.

A frame structure and reference signal mapping format of LTE (Long Term Evolution) V2X are shown in FIG. 1. In LTE V2X, fixed subcarrier spacing is 15 KHz, and scheduling is performed in subframes, where the length of one subframe is 1 millisecond. In FIG. 1, a subframe includes 14 symbols. When performing rate matching for data, the number of raw bits is calculated based on the load as 14 symbols. However, a GP (Guard period) is introduced to take into account interference between uplink and downlink data for a base station. In this way, no data is actually sent on the last symbol. At the same time, the first symbol of a subframe is used for AGC (Automatic Gain Control) processing.

It can be seen that a terminal loses useful information from at least two symbols within one subframe, resulting in a loss of performance for a terminal in Internet of Vehicles.

SUMMARY

To overcome the problems in the related art, examples of the present disclosure provide methods and apparatuses for configuration a guard period.

According to a first aspect of the examples of the present disclosure, a method of configuring a guard period is provided. The method is applicable to a transmitter in Internet of Vehicles, and the method includes:
  determining a target guard duration value corresponding to a guard period; and
  when data burst transmission is to be performed, sending target data of the data burst transmission to a receiver in the Internet of Vehicles starting from a first time point,
  where the first time point is a time point having an interval of the target guard duration value from a start time point, and the start time point is a time point at which the data burst transmission is determined to be performed.

Optionally, determining the target guard duration value corresponding to the guard period includes:
  receiving a first guard duration value configured by a base station in the Internet of Vehicles for the transmitter and sent by the base station through first preset signaling; and taking the first guard duration value as the target guard duration value.

Optionally, determining the target guard duration value corresponding to the guard period includes:
  receiving a first guard duration value configured by a base station in the Internet of Vehicles for the transmitter and sent by the base station through first preset signaling; and
  upon receiving second preset signaling for activating the first guard duration value from the base station, taking the first guard duration value as the target guard duration value.

Optionally, determining the target guard duration value corresponding to the guard period includes:
  determining the target guard duration value according to a pre-configuration of the transmitter.

Optionally, determining the target guard duration value corresponding to the guard period includes:
  determining a target transmission distance value between the transmitter and the receiver; and
  obtaining the target guard duration value corresponding to the guard period according to the target transmission distance value and a data transmission speed.

Optionally, determining the target transmission distance value between the transmitter and the receiver includes:
  if the target data is broadcast data, taking a maximum transmission distance value pre-configured for the Internet of Vehicles as the target transmission distance value.

Optionally, determining the target transmission distance value between the transmitter and the receiver includes:
  if the target data is unicast data, taking a distance value between geographic locations of the transmitter and the receiver as the target transmission distance value; or
  determining a target transmission loss for data transmission between the transmitter and the receiver; and
  determining the target transmission distance value with respect to the target transmission loss according to a pre-determined correspondence between transmission loss and transmission distance value.

Optionally, t determining the target guard duration value corresponding to the guard period includes:
  taking an integer multiple of a pre-determined duration unit value as the target guard duration value.

Optionally, the target guard duration value is a duration value corresponding to one symbol or half a symbol.

Optionally, sending the target data of the data burst transmission to the receiver in the Internet of Vehicles starting from the first time point includes:
  performing automatic gain control processing for the target data starting from the first time point; and
  upon completing the automatic gain control processing, sending the target data to the receiver in the Internet of Vehicles.

According to a second aspect of the examples of the present disclosure, a method of configuring a guard period is provided. The method is applicable to a receiver in Internet of Vehicles, and the method includes:
  determining a second time point at which to start receiving target data, where the target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter; and receiving the target data starting at the second time point.

Optionally, determining the second time point at which to start receiving the target data includes:

determining the target guard duration value; an in a current scheduling period, determining the second time point at which to start receiving the target data according to the target guard duration value.

Optionally, determining the target guard duration value e includes:

receiving a first guard duration value configured by a base station for the transmitter and sent by the base station through first preset signaling; and taking the first guard duration value as the target guard duration value.

Optionally, determining the target guard duration value includes:

receiving a second guard duration value sent from the transmitter to the receiver through broadcast signaling; and taking the second guard duration value as the target guard duration value.

Optionally, determining the target guard duration value includes:

determining a target transmission distance value between the receiver and the transmitter; and obtaining the target guard duration value corresponding to the guard period associated with the transmitter according to the target transmission distance value and a data transmission speed.

Optionally, determining the target transmission distance value between the receiver and the transmitter includes:

taking a maximum transmission distance value pre-configured for the Internet of Vehicles as the target transmission distance value; or taking a distance value between geographic locations of the receiver and the transmitter as the target transmission distance value; or determining a target data transmission loss for data transmission between the receiver and the transmitter; and determining the target transmission distance value with respect to the target transmission loss according to a pre-determined correspondence between transmission loss and transmission distance value.

Optionally, determining the target guard duration value includes:

determining the target guard duration value according to a pre-configuration of the receiver.

Optionally, determining the second time point at which to start receiving the target data includes:

performing energy detection at a plurality of time points within a current scheduling period in chronological order; and taking a time point with an energy value greater than a preset threshold as the second time point.

Optionally, determining the second time point at which to start receiving the target data includes:

determining a reference time point in a current scheduling period;

performing energy detection within a first time period of a preset duration value before the reference time point, and performing energy detection within a second time period of the preset duration value after the reference time point;

if an energy value within the second time period is greater than an energy value within the first time period, taking the reference time point as the second time point;

if the energy value within the second time period is less than the energy value within the first time period, selecting a time point before the reference time point as a new reference time point; and repeatedly performing energy detection within a first time period of the preset time length value before the reference time point, and performing energy detection within a second time period of the preset time length value after the reference time point, until the second time point is determined.

Optionally, receiving the target data starting at the second time point includes:

starting automatic gain control processing from the second time point; and upon completing the automatic gain control processing, receiving the target data.

According to a third aspect of the examples of the present disclosure, an apparatus for configuring a guard period is provided. The apparatus is applicable to a transmitter in Internet of Vehicles, and the apparatus includes:

a first determining module configured to determine a target guard duration value corresponding to a guard period; and a data sending module configured to send target data of data burst transmission to a receiver in the Internet of Vehicles starting from a first time point when the data burst transmission is to be performed, where the first time point is a time point having an interval of the target guard duration value from a start time point, and the start time point is a time point at which the data burst transmission is determined to be performed.

Optionally, the first determining module includes:

a first receiving submodule configured to receive a first guard duration value configured by a base station in the Internet of Vehicles for the transmitter and sent by the base station through first preset signaling; and a first determining submodule configured to take the first guard duration value as the target guard duration value.

Optionally, the first determining module includes:

a second receiving submodule configured to receive a first guard duration value configured by a base station in the Internet of Vehicles for the transmitter and sent by the base station through first preset signaling; and a second determining submodule configured to take the first guard duration value as the target guard duration value upon receiving second preset signaling for activating the first guard duration value from the base station.

Optionally, the first determining module includes:

a third determining submodule configured to determine the target guard duration value according to a pre-configuration of the transmitter.

Optionally, the first determining module includes:

a fourth determining submodule configured to determine a target transmission distance value between the transmitter and the receiver; and a calculating submodule configured to obtain the target guard duration value corresponding to the guard period according to the target transmission distance value and a data transmission speed.

Optionally, the fourth determining submodule includes:

a first determining unit configured to take, if the target data is broadcast data, a maximum transmission distance value pre-configured for the Internet of Vehicles as the target transmission distance value.

Optionally, the fourth determining submodule includes:
a second determining unit configured to take, if the target data is unicast data, a distance value between geographic locations of the transmitter and the receiver as the target transmission distance value; or
a third determining unit configured to determine a target transmission loss for data transmission between the transmitter and the receiver; and
a fourth determining unit configured to determine the target transmission distance value with respect to the target transmission loss according to a pre-determined correspondence between transmission loss and transmission distance value.

Optionally, the first determining module includes:
a fifth determining submodule configured to take an integer multiple of a pre-determined duration unit value as the target guard duration value.

Optionally, the target guard duration value is a duration value corresponding to one symbol or half a symbol.

Optionally, the data sending module includes:
a first executing submodule configured to perform automatic gain control processing for the target data starting from the first time point; and
a data sending submodule configured to send the target data to the receiver in the Internet of Vehicles upon completing the automatic gain control processing.

According to a fourth aspect of the examples of the present disclosure, an apparatus for configuring a guard period is provided. The apparatus is applicable to a receiver in Internet of Vehicles, and the apparatus includes:
a second determining module configured to determine a second time point at which to start receiving target data, where the target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter; and
a data receiving module configured to receive the target data starting at the second time point.

Optionally, the second determining module includes:
a sixth determining submodule configured to determine the target guard duration value; and
a seventh determining submodule configured to determine, in a current scheduling period, the second time point at which to start receiving the target data according to the target guard duration value.

Optionally, the sixth determining submodule includes:
a first receiving unit configured to receive a first guard duration value configured by a base station for the transmitter and sent by the base station through first preset signaling; and
a fifth determining unit configured to take the first guard duration value as the target guard duration value.

Optionally, the sixth determining submodule includes:
a second receiving unit configured to receive a second guard duration value sent from the transmitter to the receiver through broadcast signaling; and
a sixth determining unit configured to take the second guard duration value as the target guard duration value.

Optionally, the sixth determining submodule includes:
a seventh determining unit configured to determine a target transmission distance value between the receiver and the transmitter; and
a calculating unit configured to obtain the target guard duration value corresponding to the guard period associated with the transmitter according to the target transmission distance value and a data transmission speed.

Optionally, the seventh determining unit includes:
a first determining subunit configured to take a maximum transmission distance value pre-configured for the Internet of Vehicles as the target transmission distance value; or
A second determining subunit configured to use the geographic distance value between the receiver and the transmitter as the target transmission distance value; or
a third determining subunit configured to determine a target data transmission loss for data transmission between the receiver and the transmitter; and
a fourth determining subunit configured to determine the target transmission distance value with respect to the target transmission loss according to a pre-determined correspondence between transmission loss and transmission distance value.

Optionally, the sixth determining submodule includes:
an eighth determining unit configured to determine the target guard duration value according to a pre-configuration of the receiver.

Optionally, the second determining module includes:
an eighth determining submodule configured to perform energy detection at a plurality of time points within a current scheduling period in chronological order, and take a time point with an energy value greater than a preset threshold as the second time point.

Optionally, the second determining module includes:
a first reference time point determining submodule configured to determine a reference time point in a current scheduling period;
an energy detecting submodule configured to perform energy detection within a first time period of a preset duration value before the reference time point, and perform energy detection within a second time period of the preset duration value after the reference time point;
a ninth determining submodule configured to take the reference time point as the second time point if an energy value within the second time period is greater than an energy value within the first time period;
a second reference time point determining submodule configured to select a time point before the reference time point as a new reference time point if the energy value within the second time period is less than the energy value within the first time period; and
a second executing submodule configured to repeatedly perform energy detection within a first time period of the preset time length value before the reference time point, and perform energy detection within a second time period of the preset time length value after the reference time point, until the second time point is determined.

Optionally, the data receiving module includes:
a third executing submodule configured to start automatic gain control processing from the second time point; and
a data receiving submodule configured to receive the target data upon completing the automatic gain control processing.

According to a fifth aspect of the examples of the present disclosure, a computer-readable storage medium is provided, the storage medium stores a computer program, and the computer program is configured to perform the method of configuring a guard period described in the first aspect.

According to a sixth aspect of the examples of the present disclosure, a computer-readable storage medium is provided, the storage medium stores a computer program, and the computer program is configured to perform the method of configuring a guard period described in the second aspect.

According to a seventh aspect of the examples of the present disclosure, an apparatus for configuring a guard period is provided. The apparatus is applicable to a transmitter in Internet of Vehicles, and the apparatus includes:
  a processor, and
  memory for storing instructions executable by the processor,
  where the processor is configured to:
  determine a target guard duration value corresponding to a guard period; and
  when data burst transmission is to be performed, send target data of the data burst transmission to a receiver in the Internet of Vehicles starting from a first time point,
  where the first time point is a time point having an interval of the target guard duration value from a start time point, and the start time point is a time point at which the data burst transmission is determined to be performed.

According to an eighth aspect of the examples of the present disclosure, an apparatus for configuring a guard period is provided. The apparatus is applicable to a receiver in Internet of Vehicles, and the apparatus includes:
  a processor, and
  memory for storing instructions executable by the processor,
  where the processor is configured to:
  determine a second time point at which to start receiving target data, where the target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter; and
  receive the target data starting at the second time point.

The technical solutions provided by the examples of the present disclosure may have the following beneficial effects.

In the examples of the present disclosure, a transmitter in Internet of Vehicles may first determine a target guard duration value corresponding to a guard period, and when data burst transmission is to be sent, the transmitter in the Internet of Vehicles sends target data of the data burst transmission to a receiver in the Internet of Vehicles starting from a first time point. The first time point is a time point having an interval of the target guard duration value from a start time point, and the start time point is a time point at which the data burst transmission is determined to be performed. That is to say, in the examples of the present disclosure, the guard period is placed before the target data is sent, and a number of valid symbols in a subframe for data transmission may be increased by controlling the target guard duration value corresponding to the guard period. Thus, the performance loss of a terminal in the Internet of Vehicles is reduced, which is beneficial to the overall performance in the Internet of Vehicles.

In the examples of the present disclosure, a base station may configure a first guard duration value for a transmitter. The transmitter may also directly use the first guard duration value as a target guard duration value upon receiving first preset signaling carried the first guard duration value from the base station. In this process, the base station can configure the target guard duration value for the transmitter via signaling from a network side when the transmitter is within a network coverage area, which is easy to implement and highly usable.

In the examples of the present disclosure, a transmitter may first receive a first guard duration value from a base station, and further, the transmitter may use the first guard duration value as a target guard duration value after receiving second preset signaling from the base station. In the example, after the base station configures the first guard duration value for the transmitter, the transmitter waits for the second preset signaling from the base station, and activates configuration via the second preset signaling, then the transmitter use the first guard duration value as the target guard duration value, which has high availability.

In the examples of the present disclosure, a transmitter may first determine a target transmission distance value between the transmitter and a receiver, and then calculate a target guard duration value corresponding to a guard period according to the target transmission distance value and a data transmission speed. In the example, the transmitter can determine the target guard duration value corresponding to the guard period according to the target transmission distance value between itself and the receiver, such that the target guard duration value corresponding to the guard period may be better controlled, thereby reducing the performance loss of a terminal in the Internet of Vehicles and facilitating the overall performance of the Internet of Vehicles.

In the examples of the present disclosure, an integer multiple of a pre-determined duration unit value may also be used as a target guard duration value corresponding to a guard period. Optionally, the target guard duration value may be a duration value corresponding to one symbol or half a symbol. In the process, the target guard duration value corresponding to the guard period may be reduced, and a number of valid symbols for data transmission may be increased, thereby reducing the performance loss of a terminal in the Internet of Vehicles and facilitating the overall performance of the Internet of Vehicles.

In the examples of the present disclosure, a transmitter may start from a first time point to perform automatic gain control processing for target data and, upon completing the automatic gain control processing, send the target transmission data. In the examples of the present disclosure, the guard period is set at the beginning of each subframe, and a target guard duration value corresponding to the guard period can be controlled, such that the transmitter can more effectively use valid symbols in a subframe for target data transmission.

In the examples of the present disclosure, a receiver in Internet of Vehicles may first determine a second time point at which to start receiving target data. The target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter. Then, the receiver starts to receive the target data at the second time point. In the examples, a transmitter in the Internet of Vehicles sets the guard period at the beginning of each subframe, and all subsequent transmission are useful information. Thus, the receiver can start to receive target data at the second time point after the second time point for starting receiving the target data has been determined. The performance loss of a terminal in the Internet of Vehicles is reduced, and the overall performance of the Internet of Vehicles is facilitated.

In the examples of the present disclosure, a receiver may first determine a target guard duration value corresponding to a guard period associated with a transmitter, and then in a current scheduling period, determine a second time point for starting receiving target data according to the target guard duration value. Optionally, the receiver may receive a first guard duration value configured by a base station for the transmitter and sent by the base station through first preset signaling, and then use the first guard duration value as the target guard duration value. Alternatively, the receiver may receive a second guard duration value sent from the transmitter to the receiver through broadcast signaling, and then use the second guard duration value as the target guard duration value. Alternatively, the receiver may also determine the target guard duration value according to a target transmission distance value between the receiver and the transmitter. Alternatively, the receiver may determine the target guard duration value according to its own pre-configuration. In the examples, the receiver may automatically determine the target guard duration value corresponding to the guard period associated with the transmitter, so as to determine the second time point for receiving the target data, which is easy to implement and has high availability.

In the examples of the present disclosure, if the receiver cannot obtain the target guard duration value, optionally, energy detection may also be used to determine the second time point. A time point at which the energy value is greater than the preset threshold is taken as the second time point. In other words, the receiver uses a time point at which detecting relative high energy output as the second time point for receiving the target data. Thus, the second time point can be determined quickly and accurately, and the availability is high.

In the examples of the present disclosure, a receiver may also first determine a reference time point, and perform energy detection with a first time period and a second time period which are before and after the reference time point, respectively. If an energy value within the second time period is greater than an energy value within the first time period, the reference time point is used as the second time point. Otherwise, a time point before the reference time point is selected as a new reference time point, and the above steps of performing energy detection in the first time period and the second time period before and after a reference time point, respectively, can be repeated until the second time point is determined. Through the above process, in a case where the target guard duration value is not known, the receiver may accurately determine the second time point for receiving the target data, which has high availability. Further, by placing a guard period before sending target data and controlling a target guard duration value corresponding to the guard period, a number of valid symbols for data transmission in a subframe may be increased, which achieves the purpose of reducing the performance loss of a terminal in Internet of Vehicles and facilitates the overall performance of the Internet of Vehicles.

The above general description and the following detailed description are intended to be illustrative and not restrictive.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
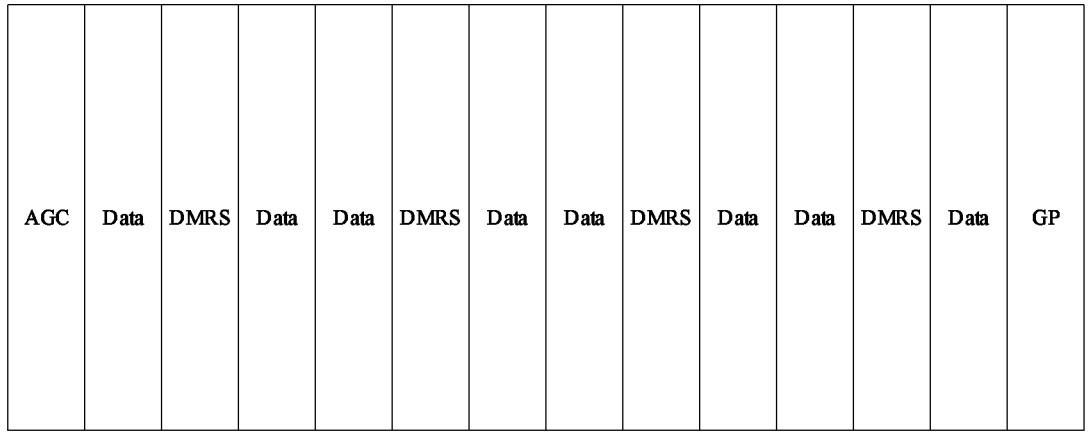
FIG. 1 is a schematic diagram illustrating a configuration scenario of a guard period in the related art according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

Before introducing a method of configuring a guard period provided by examples of the present disclosure, physical layer processing during data transmission in the related art is described firstly. The process includes the following steps.

At step 1, a CRC (Cyclic Redundancy Check) is attached to each transport block.

In the related art, to ensure error detection for a channel, CRC checksums need to be attached to data blocks from a MAC (Media Access Control) layer.

At step 2, code block segmentation, and CRC information is attached to the segmented code block.

To ensure that a code block is not larger than a preset value, such as 6144 bits, a transport block needs to be segmented. To ensure that a receiver can abort error decoding in advance, additional CRC information is attached to each code block.

At step 3, channel coding.

In the related art, a sequence with k bits can be encoded into a sequence with n bits, where the bits before encoding are referred to as original bits or source bits, and the bits after encoding are referred to as codewords or codeword bits. In general, the value of n is greater than or equal to the value of k, and k/n is referred to as a coding rate of the coding.

At step 4, rate matching.

Physical resources for actual transmission do not match the encoded bits. If the physical resources for actual transmission are larger than a number of the encoded bits, certain repetition of the encoded bits may be performed according to a certain rule. If the physical resources for actual transmission are smaller than the number of the encoded bits, a part of the encoded bits should be pruned. Thus, the matching between transmission capacity and transmission data is achieved.

For example, a physical bearer allocated to a user is 2 data blocks with 12 subcarriers on each data block, 14 symbols for each subcarrier, modulated by QPSK (Quadrature Phase-Shift Keying) modulation, and transmitted through a single-port antenna. Therefore, the currently available physical bearer is: $2 \times 12 \times 14 \times 2 = 672$, while the transmitted data after encoding is 70 bits, it is necessary to repeat the 70 bits to 672 bits according to a certain rule. This process is called rate matching.

At step 5, code block concatenation.

At step 6, channel interleaver.

To avoid the influence of channel selective fading on information, transmission data can be interleaved according to the related art.

At step 7, a logical channel is mapping to a physical channel.

Resources to be transmitted are mapped to physical resources to be transmitted according to a certain time-frequency-domain mapping criterion. The physical resources refer to as resources for actual transmission indicated by the time domain, frequency domain, space domain, and code domain.

At step 8, OFDM (Orthogonal Frequency Division Multiplexing) modulation and CP (Cyclic Prefix) addition.

At step 9, parallel to serial conversion, and send in chronological order.

A method of configuring a guard period provided by examples of the present disclosure is used after step 9 is completed, the following description will be made from a transmitter in Internet of Vehicles (IoV).

Figure 2:
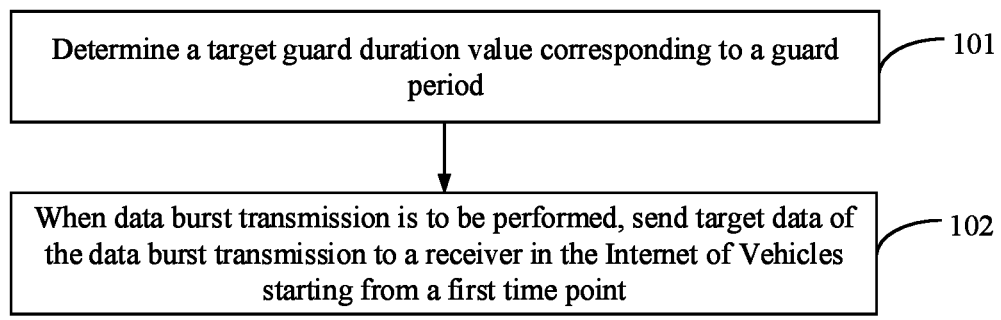
FIG. 2 is a flowchart illustrating a method of configuring a guard period according to an example.

A method of configuring a guard period is provided by examples of the present disclosure, which can be used at a transmitter in the Internet of Vehicles. Referring to FIG. 2, which is a flowchart illustrating a method of configuring a guard period according to an example, the method can include the following steps.

At step 101, a target guard duration value corresponding to a guard period is determined.

At step 102, when it is to perform data burst transmission, target data of the data burst transmission is sent to a receiver in the Internet of Vehicles starting from a first time point.

The first time point is a time point having an interval of the target guard duration value from a start time point, and the starting time point is a time point at which the data burst transmission is determined to be performed.

In the example, a transmitter in the Internet of Vehicles can first determine the target guard duration value corresponding to the guard period, and send, to a receiver in the Internet of Vehicles, the target data of the data burst transmission starting from the first time point when data burst transmission is required to be sent. The first time point is a time point delayed the target guard duration value from a starting time point, and the starting time point is a time point at which the data burst transmission is originally determined to be sent. That is to say, in the examples of the present disclosure, the guard period is placed before the target data is sent, and a number of valid symbols in a subframe for data transmission may be increased by controlling the target guard duration value corresponding to the guard period. Thus, the performance loss of a terminal in the Internet of Vehicles is reduced, which is beneficial to the overall performance in the Internet of Vehicles.

For the above step 101, the transmitter may determine the target guard duration value in any one of the following approaches.

In a first approach, a base station configures the target guard duration value for the transmitter.

Figure 3:
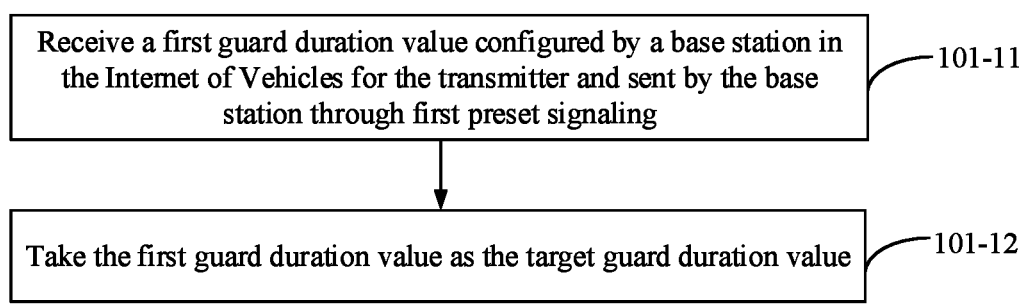
FIG. 3 is a flowchart illustrating another method of configuring a guard period according to an example.

In this approach, referring to FIG. 3, which is a flowchart illustrating another method of configuring a guard period based on the example shown in FIG. 2, optionally, step 101 may include the following steps.

At step 101-11, a first guard duration value is received, where the first guard duration value is configured by a base station in the Internet of Vehicles for the transmitter, and is sent by the base station through first preset signaling.

In the step, the base station may configure the first guard duration value for the transmitter in accordance with the related art. The base station sends the first guard duration value to the transmitter via the first preset signaling, such as RRC (Radio Resource Control) signaling.

Optionally, the base station may send the first guard duration value to multiple transmitters in the Internet of Vehicles within a coverage area of the base station through broadcast signaling. That is to say, multiple transmitters in the Internet of Vehicles within the same cell have the same first guard duration value.

At step 101-12, the first guard duration value is taken as the target guard duration value.

In the step, the transmitter may directly use the first guard duration value configured by the base station as the target guard duration value.

In the example, the transmitter directly uses the first guard duration value configured by the base station as the target guard duration value, which is easy to implement and has high availability.

Figure 4:
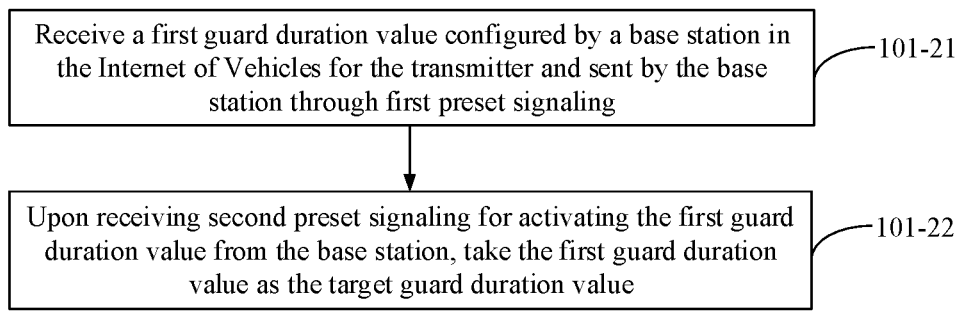
FIG. 4 is a flowchart illustrating another method of configuring a guard period according to an example.

Alternatively, referring to FIG. 4, which is a flowchart illustrating another method of configuring a guard period based on the example shown in FIG. 2, optionally, step 101 may include the following steps.

At step 101-21, a first guard duration value is received, the first guard duration value is configured by a base station in the Internet of Vehicles for the transmitter, and is sent by the base station through first preset signaling.

This step is the same as step 101-11. The base station may configure the first guard duration value for the transmitter in accordance with the related art. The base station sends the first guard duration value to the transmitter via the first preset signaling, such as RRC (Radio Resource Control) signaling.

Optionally, the base station may send the first guard duration value to multiple transmitters in the Internet of Vehicles within a coverage area of the base station through broadcast signaling. That is to say, multiple transmitters in the Internet of Vehicles within the same cell have the same first guard duration value.

At step 101-22, when second preset signaling for activating the first guard duration value is received from the base station, the first guard duration value is taken as the target guard duration value.

In the step, after receiving the first guard duration value, the transmitter may wait for receiving the second preset signaling, such as MAC signaling, from the base station before using the first guard duration value as the target guard duration value.

In the example, the base station may pre-configure the first guard duration value for the transmitter. The transmitter waits for the second preset signaling from the base station, and after receiving the second preset signaling, takes the first guard duration value as the target guard duration value.

In the example, the base station may configure the first guard duration value for the transmitter in advance, and subsequently activate the first guard duration value through the second preset signaling, which is simple to implement and has high availability.

Both of the above methods are applicable to a case where the transmitter is located in a network coverage area, and the target guard duration value can be configured by the base station through signaling in a network side. In the examples of the present disclosure, if the transmitter is not in a network coverage area, the following approaches may be used to determine the target guard duration value.

In a second approach, the target guard duration value is determined by the transmitter according to its own pre-configuration.

In this approach, a target guard duration value may be pre-configured by an underlying protocol of a terminal. When the transmitter is in an area without network coverage, the transmitter may determine the target guard duration value directly based on the pre-configuration.

In a third approach, the target guard duration value is determined according to a target transmission distance between the transmitter and the receiver.

Figure 5:
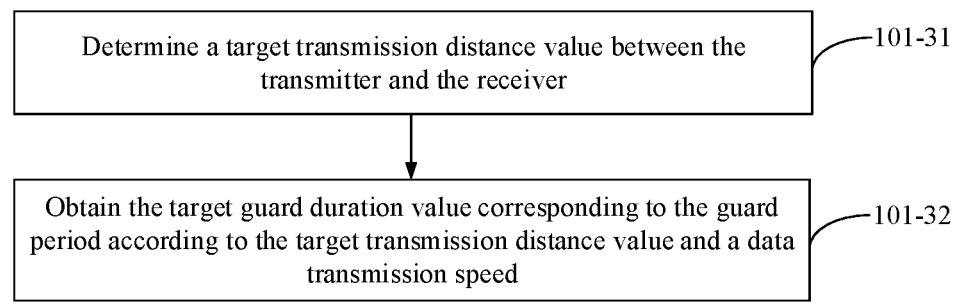
FIG. 5 is a flowchart illustrating another method of configuring a guard period according to an example.

Referring to FIG. 5, which is a flowchart illustrating another method of configuring a guard period based on the example shown in FIG. 2, step 101 may include the following steps.

At step 101-31, a target transmission distance value between the transmitter and the receiver is determined.

In the step, if the target data is broadcast data, the transmitter may use a maximum transmission distance value pre-configured for the Internet of Vehicles in a transmitter's own underlying protocol as the target transmission distance value.

If the target data to be sent is unicast data, the transmitter may use a distance value between geographic locations of the transmitter and the receiver as the target transmission distance value. The transmitter can obtain its own geographic location information through GPS (Global Positioning System), the receiver can also obtain its own geographic location information through GPS, and the receiver can send its own geographic location information to the transmitter. The transmitter can determine the distance value between the geographic locations according to respective geographic location information of both, and use the distance value between the geographic locations as the target transmission distance value.

Figure 6:
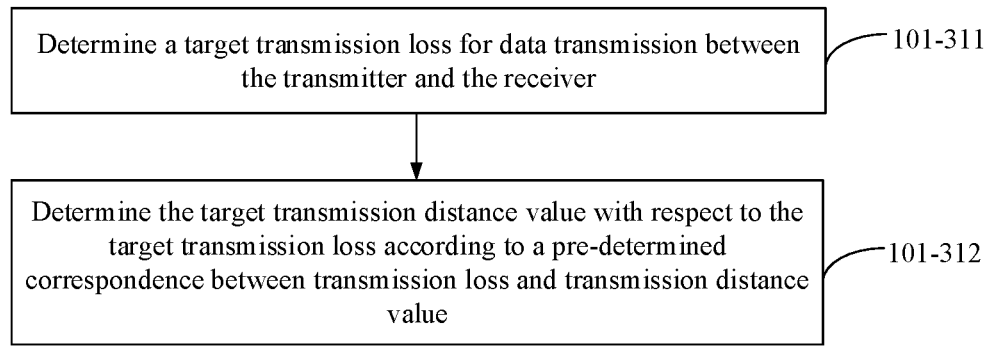
FIG. 6 is a flowchart illustrating another method of configuring a guard period according to an example.

Alternatively, if the target data to be sent is unicast data, referring to FIG. 6, which is a flowchart illustrating another method of configuring a guard period based on the example shown in FIG. 5, step 101-31 may include the following steps.

At step 101-311, a target transmission loss for data transmission between the transmitter and the receiver is determined.

In the step, pre-determined data transmission between the transmitter and the receiver may be performed in advance, and the target transmission loss for data transmission between the transmitter and the receiver is determined by the transmitter based on feedback information from the receiver using the related art.

At step 101-312, the target transmission distance value with respect to the target transmission loss is determined according to a pre-determined correspondence between transmission loss and transmission distance value.

In the step, the transmitter may determine the target transmission distance value with respect to the target transmission loss according to a mapping relationship model between transmission loss and transmission distance value.

At step 101-32, the target guard duration value corresponding to the guard period is obtained according to the target transmission distance value and a data transmission speed.

In the step, after determining the target transmission distance value, the transmitter may use the following Formula 1 to calculate target guard duration value T corresponding to the guard period based on the target transmission distance value and the data transmission speed:

$$T=2s/v \qquad \text{Formula 1,}$$

where, s refers to as the target transmission distance value, and v refers to as the data transmission speed. In the examples of the present disclosure, the value of v may use the speed of light as in the related art.

In the example, the transmitter may determine the target guard duration value according to the target transmission distance between itself and the receiver, which has high availability.

In the examples of the present disclosure, the transmitter may also determine the target guard duration value in the following approach.

In a fourth approach, an integer multiple of a pre-determined duration unit value is taken as the target guard duration value.

Pre-determined duration unit value $T_c$ may be calculated using Formula 2:

$$T_c=1/(\Delta f_{max} \times N_f) \qquad \text{Formula 2,}$$

where, $\Delta f_{max}=480 \times 10^3$ Hertz, and $N_f=4096$.

In the examples of the present disclosure, other time values may be used as pre-determined duration unit value $T_c$, which is not limited in the present disclosure.

In the approach, optionally, target guard duration value T may be determined and calculated using Formula 3:

$$T=N \times T_c \qquad \text{Formula 3,}$$

where, N refers to as an integer 1, 2, 3, . . . , and $T_c$ refers to as a pre-determined duration unit value.

In the examples of the present disclosure, optionally, the target guard duration value may be a duration value corresponding to one symbol or half a symbol.

If the target guard duration value is a time length value corresponding to half a symbol, in the above formula 3, the value of N may be $(N_u^\mu+N_{CP,l-1})/2$. Correspondingly, if the target guard duration value is a time length value corresponding to one symbol, in the above formula 3, the value of N may be $(N_u^\mu+N_{CP,l-1}^\mu)/2$.

μ refers to as subcarrier spacing configuration, the value of u may be 0, 1, 2, . . . , $N_u^\mu=2048 \text{ k} \times 2^{-\mu}$, and $$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix}, l = 0 \text{ or } l = 7 \cdot 2^\mu \\ 144\kappa \cdot 2^{-\mu} & \text{normal cyclic prefix}, l \neq 0 \text{ and } l \neq 7 \cdot 2^\mu \end{cases}.$$

In the examples of the present disclosure, a target guard duration value corresponding to a guard period may be determined by any one of the above approaches, such that a number of valid symbols for data transmission in a subframe may be increased, and the performance loss of a terminal in the Internet of Vehicles may be reduced, which facilitating the overall performance of the Internet of Vehicles.

Figure 7:
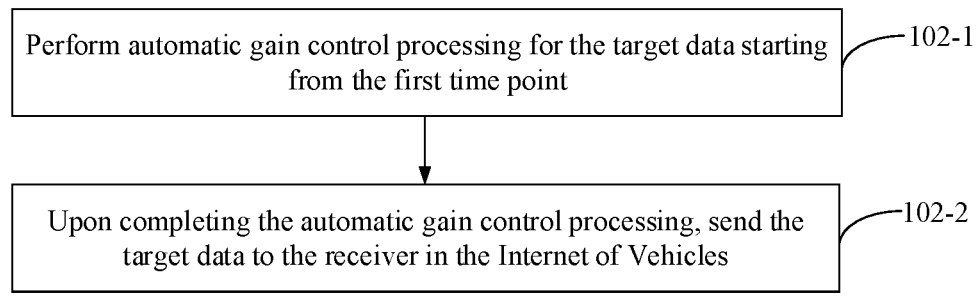
FIG. 7 is a flowchart illustrating another method of configuring a guard period according to an example.

With respect to step 102 above, as shown in FIG. 7, which is a flowchart illustrating another method of configuring a guard period based on the example shown in FIG. 2, step 102 may include the following steps.

At step 102-1, automatic gain control processing for the target data is performed starting from the first time point.

In the step, the transmitter may, when data burst transmission is required to be sent, not send any data within a target guard duration, and perform automatic gain control processing in accordance with the related art starting from the first time point. The first time point is a time point having an interval of a value of the target guard duration, i.e., the target guard duration value, from a start time point, and the starting time point is a time point at which the data burst transmission is determined to be performed.

At step 102-2, upon completing the automatic gain control processing, the target data is sent.

In the step, the transmitter will send the target data through other symbols within the subframe when the automatic gain control processing is completed.

Figure 8:
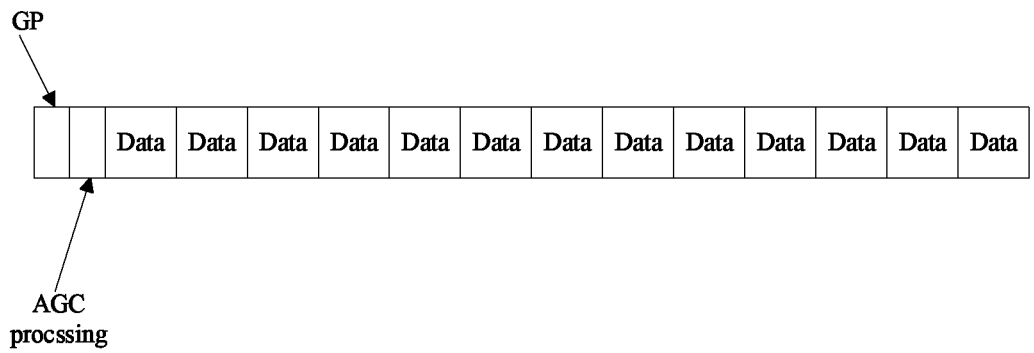
FIG. 8 is a schematic diagram illustrating a configuration scenario of a guard period according to an example.

As shown in FIG. 8, the target guard duration value corresponding to the guard period can be set to be a time length value corresponding to one symbol or half a symbol. Then the transmitter may perform automatic gain control processing immediately after the guard period, and send the target data to a receiver in the Internet of Vehicles after the automatic gain control processing is completed.

In the examples, a transmitter can control a target guard duration value corresponding to a guard period, set the guard period at the beginning of each subframe, and the remaining symbols can be used for data transmission except for automatic gain control processing, which increasing a number of valid symbols for data transmission in a subframe, reducing the performance loss of a terminal in the Internet of Vehicles, and facilitating the overall performance of the Internet of Vehicles.

The methods are further illustrated below from a receiver side in the Internet of Vehicles.

Figure 9:
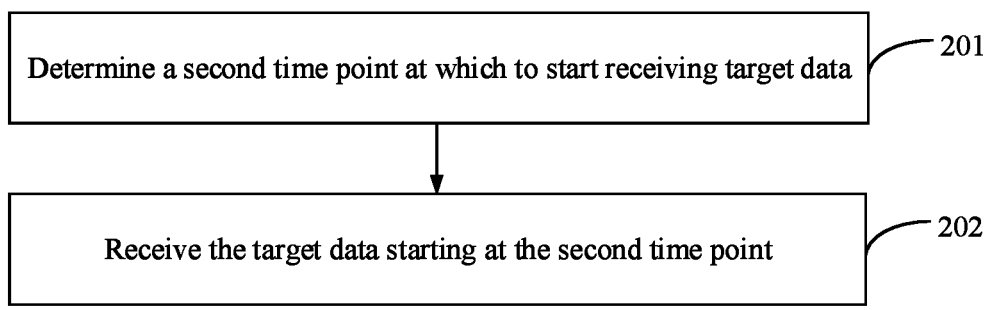
FIG. 9 is a schematic diagram illustrating a configuration scenario of a guard period according to an example.

Examples of the present disclosure provide another method of configuring a guard period, which can be used at a receiver in the Internet of Vehicles. Referring to FIG. 9, which is a flowchart illustrating another method of configuring a guard period according to an example, the method can include the following steps.

At step 201, a second time point at which to start receiving target data is determined. The target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter.

At step 202, the target data is received starting at the second time point.

In the example, a transmitter in the Internet of Vehicles sets the guard period at the beginning of each subframe, and all subsequent transmission are useful information. Thus, the receiver can start to receive target data at a second time point after the second time point for starting receiving the target data has been determined. The performance loss of a terminal in the Internet of Vehicles is reduced, and the overall performance of the Internet of Vehicles is facilitated.

For step 201, the receiver may determine the second time point in the following two cases, respectively.

In a first case, the receiver first determines the target guard duration value corresponding to the guard period associated with the transmitter, and then determines the second time point according to the target guard duration value.

Figure 10:
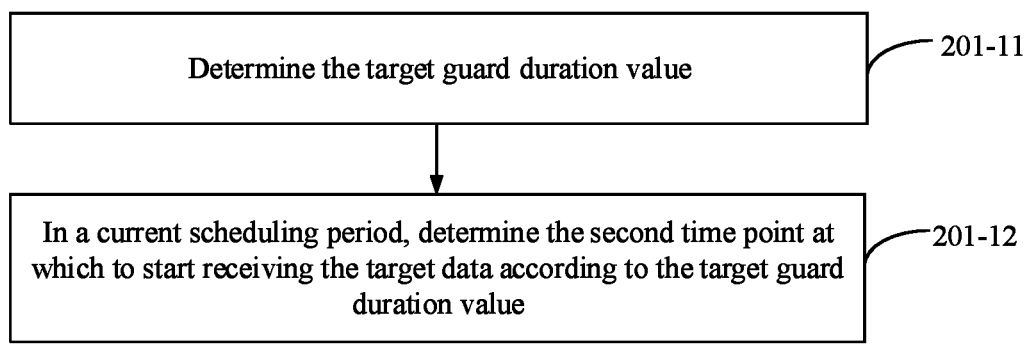
FIG. 10 is a schematic diagram illustrating a configuration scenario of a guard period according to an example.

In this case, referring to FIG. 10, which is another flowchart illustrating a method of configuring a guard period based on the example shown in FIG. 9, step 201 may include the following steps.

At step 201-11, the target guard duration value is determined.

In the step, the receiver can determine the target guard duration value in any one of the following approaches.

In a first approach, the target guard duration value is determined via a network side.

Figure 11:
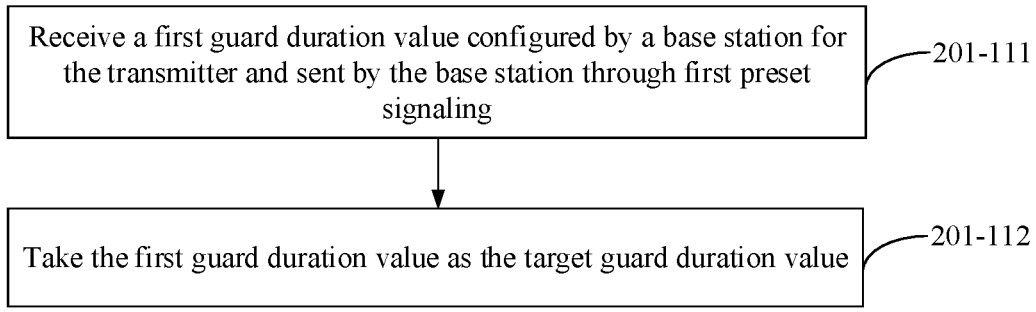
FIG. 11 is a schematic diagram illustrating a configuration scenario of a guard period according to an example.

In this approach, referring to FIG. 11, which is another flowchart illustrating a method of configuring a guard period based on the example shown in FIG. 10, step 201-11 may include the following steps.

At step 201-111, a first guard duration value is received, where the first guard duration value is configured by a base station for the transmitter, and is sent by the base station through first preset signaling.

In the step, after the base station configures the first guard duration value for the transmitter, in addition to sending the first guard duration value to the transmitter through the first preset signaling, the base station may also send the first guard duration value to the receiver via the first preset signaling.

Optionally, the base station may send the first guard duration value to all terminals in an area covered by the base station via broadcast signaling, such that the first guard duration value can be received by both the transmitter and the receiver.

At step 201-112, the first guard duration value is taken as the target guard duration value.

In the step, the receiver may directly use the first guard duration value as the target guard duration value corresponding to the guard period associated with the transmitter.

In a second approach, the target guard duration value is determined through broadcast signaling from the transmitter.

Figure 12:
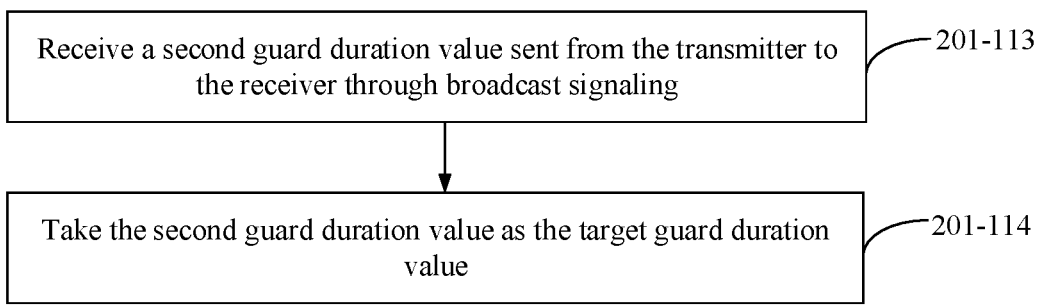
FIG. 12 is a schematic diagram illustrating a configuration scenario of a guard period according to an example.

In this approach, referring to FIG. 12, which is a flowchart illustrating another method of configuring a guard period based on the example shown in FIG. 10, step 201-11 may include the following steps.

At step 201-113, a second guard duration value is received, where the second guard duration value is sent from the transmitter to the receiver through broadcast signaling.

In the step, the receiver may receive the second guard duration value broadcast by the transmitter to the receiver through broadcast signaling.

At step 201-114, the second guard duration value is taken as the target guard duration value.

In the step, the receiver may directly use the second guard duration value as the target guard duration value corresponding to the guard period associated with the transmitter.

In a third approach, the target guard duration value is determined according to a target transmission distance between the transmitter and the receiver.

Figure 13:
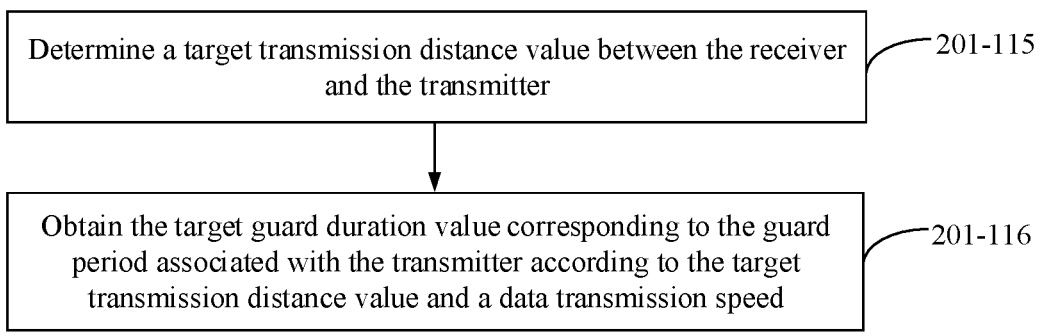
FIG. 13 is a schematic diagram illustrating a configuration scenario of a guard period according to an example.

In this approach, referring to FIG. 13, which is a flowchart illustrating another method of configuring a guard period based on the example shown in FIG. 10, step 201-11 may include the following steps.

At step 201-115, a target transmission distance value between the transmitter and the receiver is determined.

In the step, the receiver may determine the target transmission distance value between the receiver and the transmitter according to an underlying protocol.

Alternatively, the receiver may obtain its own geographic location information through GPS and, after receiving geographic location information of the transmitter determined by the transmitter, calculate a distance value between geographic locations of the receiver and the transmitter according to their respective geographic location information in accordance with the related art. The distance value between the geographic locations of the receiver and the transmitter is used as the target transmission distance value.

Alternatively, in the examples of the present disclosure, pre-determined data transmission may be performed between the receiver and the transmitter in advance, and the receiver determines a target data transmission loss for data transmission between the receiver and the transmitter based on feedback information from the transmitter using the related art. Then, the receiver may determine the target transmission distance value with respect to the target transmission loss according to a mapping relationship model between transmission loss and transmission distance value.

At step 201-116, the target guard duration value corresponding to the guard period associated with the transmitter is obtained according to the target transmission distance value and a data transmission speed.

In the step, after determining the target transmission distance value, the receiver may calculate target guard duration value T corresponding to the guard period based on the target transmission distance value and the data transmission speed by using Formula 1 above.

In a fourth approach, the target guard duration value is determined according to pre-configuration of the receiver.

In this approach, a target guard duration value may be pre-configured in an underlying protocol of a terminal. The receiver may use the guard duration value in its own pre-configuration as the target guard duration value when the receiver is in an area without network coverage.

At step 201-12, in a current scheduling period, the second time point at which to start receiving the target data is determined according to the target guard duration value.

In the examples of the present disclosure, the receiver, after determining the target guard duration value, may take a time point as the second time point, where the time point has an interval of the target guard duration value from a start time point of the current scheduling period. A scheduling period is a set of resources that allows a terminal to send or receive data.

The above examples are for cases where the receiver can first determine the target guard duration value and then determine the second time point, which are easy to implement and have high availability.

If the receiver cannot determine the target guard duration value, any one of the following ways can be used to determine the second time point.

In a first way, energy detection is performed in chronological order.

In this way, the receiver can detect energy at multiple time points in a current scheduling period in accordance with the related art. For example, a filter is used, which can acquire energy from signals received in a specified time period before and after a certain time point, and then the acquired energy is averaged, and the obtained energy value may be used as an energy value for that time point. If an energy value corresponding to a certain time point in the chronological order is greater than a preset threshold, the receiver may directly use the certain time point as the second time point.

In the example, if the receiver cannot obtain the target guard duration value, optionally, energy detection may also be used to determine the second time point. A time point at which the energy value is greater than the preset threshold is taken as the second time point. In other words, the receiver uses a time point at which detecting relative high energy output as the second time point for receiving the target data. Thus, the second time point can be determined quickly and accurately, and the availability is high.

In a second way, a reference time point is set, and the second time point is determined according to the reference time point.

Figure 14:
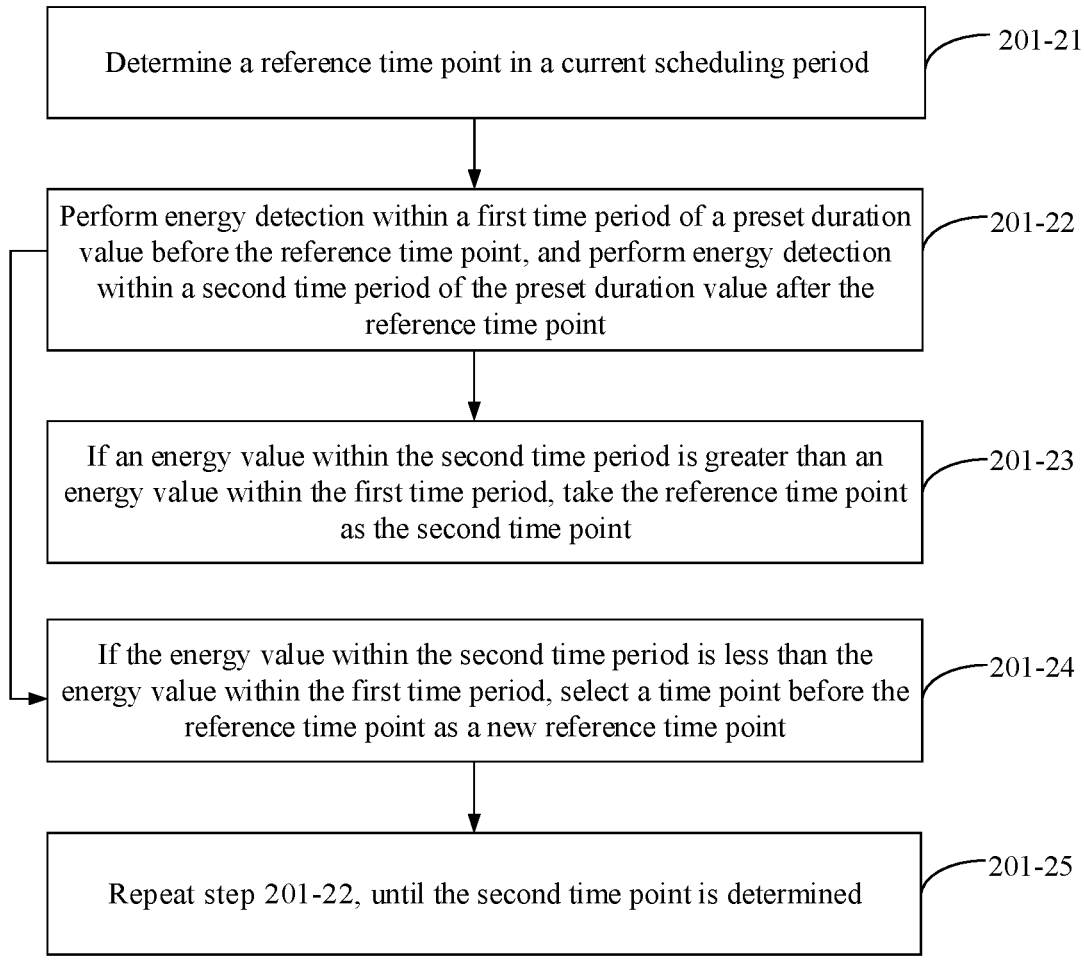
FIG. 14 is a schematic diagram illustrating a configuration scenario of a guard period according to an example.

In this way, referring to FIG. 14, which is another flowchart illustrating a method of configuring a guard period based on the example shown in FIG. 9, step 201 may include the following steps.

At step 201-21, a reference time point is determined in a current scheduling period.

In the step, optionally, the receiver may determine a guard duration value specified in its own underlying protocol according to its own pre-configuration, and use a time point, at which the guard duration value is interval from a start time point of the current scheduling period, as the reference time point.

At step 201-22, energy detection is performed within a first time period of a preset duration value before the reference time point, and energy detection is performed within a second time period of the preset duration value after the reference time point.

In the step, the receiver may detect energy during the first time period which is a preset duration before the reference time point, and detect energy during the second time period which is the preset duration after the reference time point, in accordance with the related art.

At step 201-23, if an energy value within the second time period is greater than an energy value within the first time period, the reference time point is taken as the second time point.

In the step, the receiver may use the reference time point as the second time point when energy value E2 within the second time period and energy value E1 within the first time period satisfy Formula 4 and Formula 5.

$$(E2-E1)/E2 > y \qquad \text{Formula 4,}$$

$$E2-E1 > z \qquad \text{Formula 5,}$$

where, y and z refer to as a default value.

That is, if the energy value within the second time period is greater than the energy value within the first time period, it means that there is data transmission in the second time period. Thus, the reference time point may be used as the second time point.

At step 201-24, if the energy value within the second time period is less than or equal to the energy value within the first time period, a time point before the reference time point is selected as a new reference time point.

In the step, if the energy value within the second time period is less than or equal to the energy value within the first time period, it means that there is data transmission in the first time period. Therefore, it is necessary to select a time point before the reference time point as a new reference time point.

At step 201-25, step 201-22 is repeated until the second time point is determined.

In the step, after determining the new reference time point, the receiver continues to repeat step 201-22 and corresponding steps until the second time point is determined.

In the examples, in a case where the target guard duration value is not known, the receiver may accurately determine the second time point for receiving the target data, which has high availability. Further, by placing a guard period before sending target data and controlling a target guard duration value corresponding to the guard period, a number of valid symbols for data transmission in a subframe may be increased, which achieves the purpose of reducing the performance loss of a terminal in Internet of Vehicles and facilitates the overall performance of the Internet of Vehicles.

Figure 15:
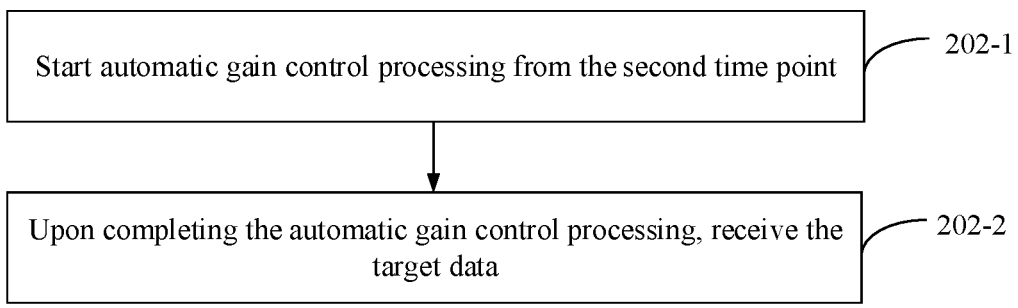
FIG. 15 is a schematic diagram illustrating a configuration scenario of a guard period according to an example.

After the second time point is determined by the receiver, referring to FIG. 15, which is a flowchart illustrating another method of configuring a guard period based on the example shown in FIG. 9, step 202 can include the following steps.

At step 202-1, automatic gain control processing is started from the second time point.

In the step, the receiver may start automatic gain control processing from the second time point in accordance with the related art. Alternatively, the receiver may start performing other processing operation, such as sampling, etc., at the second time point.

At step 202-2, upon completing the automatic gain control processing, the target data is received.

In the step, the receiver will receive the target data in accordance with the related art when the receiver completes the automatic gain control processing.

In the examples, the receiver may first perform automatic gain control processing after determining the second time point. Further, the receiver may receive the target data when completing the automatic gain control processing. Based on this process, the performance loss of a terminal in Internet of Vehicles is reduced, which is beneficial to improve the overall performance of the Internet of Vehicles.

A method of configuring a guard period provided by the examples of the present disclosure is further illustrated below.

Figure 16:
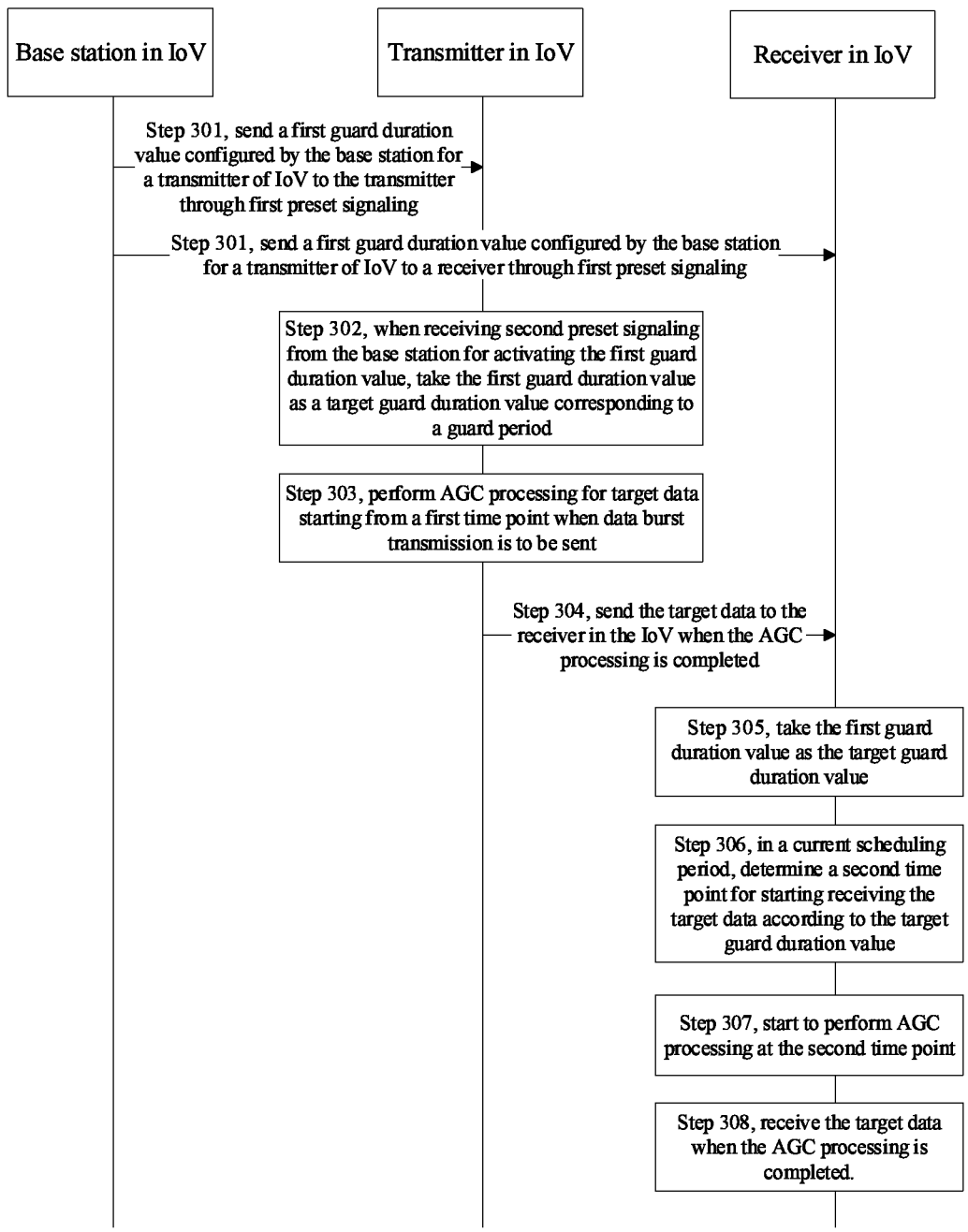
FIG. 16 is a schematic diagram illustrating a configuration scenario of a guard period according to an example.

Referring to FIG. 16, which is a flowchart illustrating another method of configuring a guard period configuration according to an example, the method may include the following steps.

At step 301, a base station sends a first guard duration value to a transmitter and a receiver through first preset signaling, where the first guard duration value is configured by the base station for the transmitter in Internet of Vehicles.

At step 302, when receiving second preset signaling from the base station for activating the first guard duration value, the transmitter takes the first guard duration value as a target guard duration value corresponding to a guard period.

At step 303, the transmitter performs automatic gain control processing for target data starting from a first time point when the transmitter is to send data burst transmission.

The first time point is a time point at which the target guard duration value is interval from a start time point, and the starting time point is a time point at which the data burst transmission is determined to be performed.

At step 304, the transmitter sends the target data to the receiver in the Internet of Vehicles when the automatic gain control processing is completed.

At step 305, the receiver takes the first guard duration value as the target guard duration value.

At step 306, in a current scheduling period, the receiver determines a second time point for starting receiving the target data according to the target guard duration value.

At step 307, the receiver starts to perform automatic gain control processing at the second time point.

At step 308, the receiver receives the target data when the automatic gain control processing is completed.

In the example, the transmitter may also directly use the first guard duration value as the target guard duration value upon receiving the first guard duration value configured by the base station. In this process, the base station can configure the target guard duration value for the transmitter via signaling from a network side when the transmitter is within a network coverage area, which is easy to implement and highly usable. By placing a guard period before sending target data and controlling a target guard duration value corresponding to the guard period, a number of valid symbols for data transmission in a subframe may be increased, which reduces the performance loss of a terminal in Internet of Vehicles and facilitates the overall performance of the Internet of Vehicles.

Figure 17:
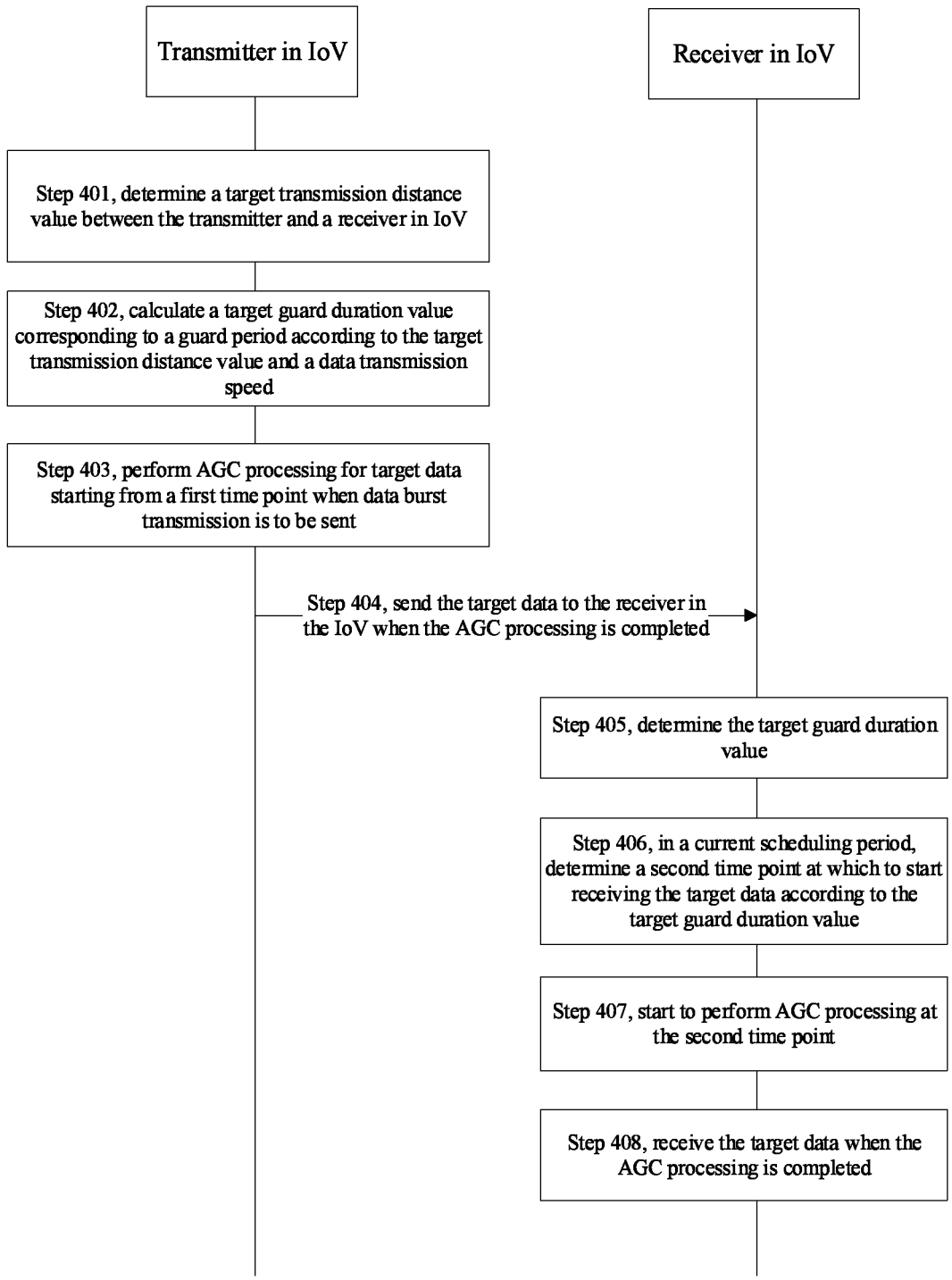
FIG. 17 is a schematic diagram illustrating a configuration scenario of a guard period according to an example.

Referring to FIG. 17, which is a flowchart illustrating another method of configuring a guard period according to an example, the method may include the following steps.

At step 401, a transmitter determines a target transmission distance value between the transmitter and a receiver in Internet of Vehicles.

Optionally, if target data is broadcast data, a maximum transmission distance value pre-configured for the Internet of Vehicles is used as the target transmission distance value. If the target data is unicast data, a distance value between geographic locations of the transmitter and the receiver is used as the target transmission distance value, or a target transmission distance value with respect to a target transmission loss is determined based on the target transmission loss for data transmission between the transmitter and the receiver.

At step 402, the transmitter calculates a target guard duration value corresponding to a guard period according to the target transmission distance value and a data transmission speed.

At step 403, the transmitter performs automatic gain control processing for target data starting from a first time point when the transmitter is to send data burst transmission.

The first time point is a time point having an interval of the target guard duration value from a start time point, and the starting time point is a time point at which the data burst transmission is determined to be performed.

At step 404, the transmitter sends the target data to the receiver in the Internet of Vehicles when the automatic gain control processing is completed.

At step 405, the receiver determines the target guard duration value.

Optionally, the transmitter may broadcast a second guard duration value to the receiver, and the receiver may use the second guard duration value as the target guard duration value. Alternatively, the receiver also determines the target guard duration value based on the target transmission distance value between the transmitter and the receiver. The receiver determines the target guard duration value according to the target transmission distance value between the transmitter and the receiver in the same approach as step 201-115 above, and will not be repeated herein.

At step 406, in a current scheduling period, the receiver determines a second time point at which to start receiving the target data according to the target guard duration value.

At step 407, the receiver starts to perform automatic gain control processing at the second time point.

At step 408, the receiver receives the target data when the automatic gain control processing is completed.

In the example, the transmitter may determine the target guard duration value based on a target transmission distance value between the transmitter and the receiver, which is easy to implement and has high availability. The guard period is placed before the target data is sent, and a number of valid symbols in a subframe for data transmission may be increased by controlling the target guard duration value corresponding to the guard period. Thus, the performance loss of a terminal in the Internet of Vehicles is reduced, which is beneficial to the overall performance in the Internet of Vehicles.

Figure 18:
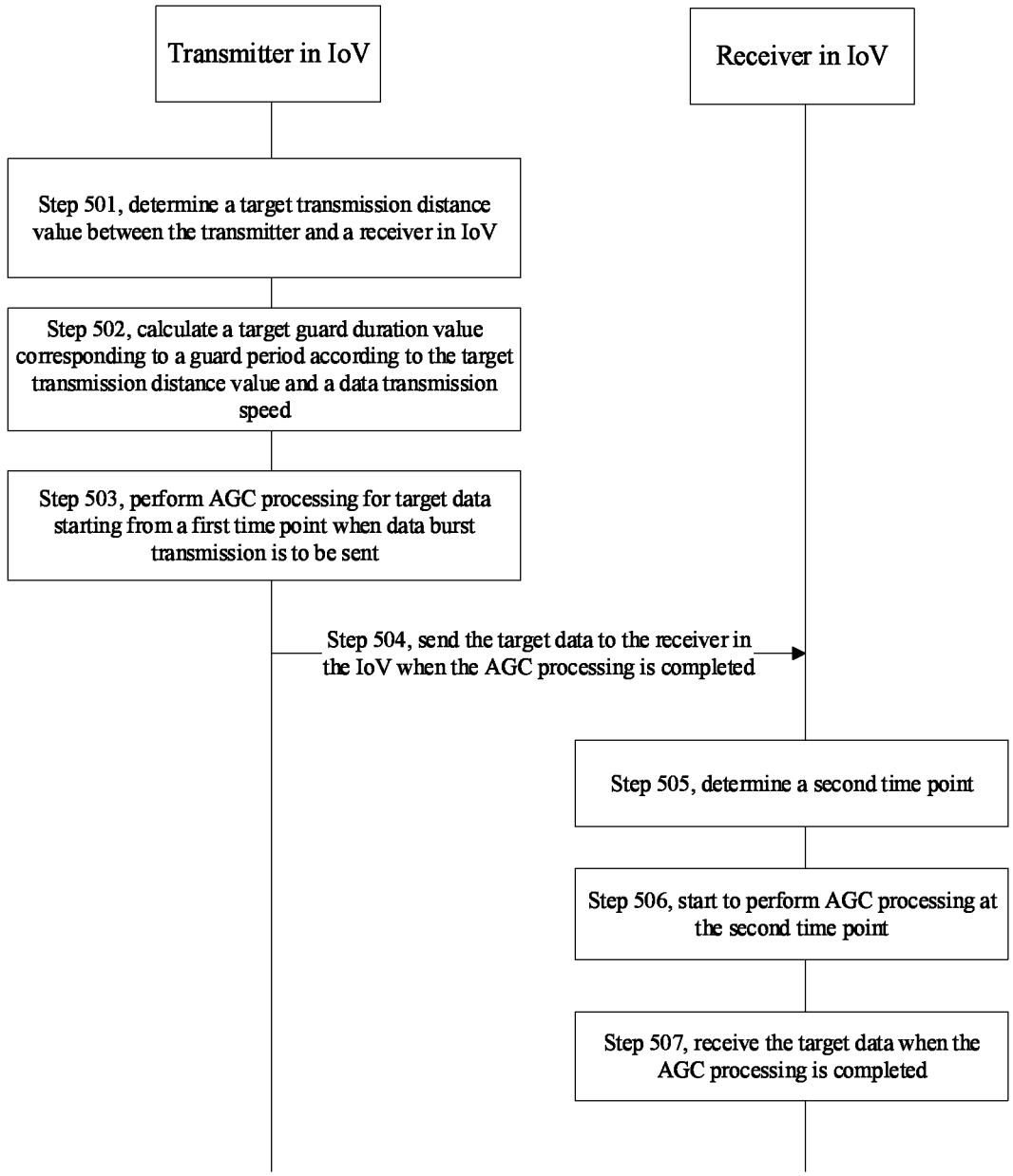
FIG. 18 is a schematic diagram illustrating a configuration scenario of a guard period according to an example.

Referring to FIG. 18, which is a flowchart illustrating another method of configuring a guard period according to an example, the method may include the following steps.

At step 501, a transmitter determines a target transmission distance value between the transmitter and a receiver in Internet of Vehicles.

Optionally, if target data is broadcast data, a maximum transmission distance value pre-configured for the Internet of Vehicles is taken as the target transmission distance value. If the target data is unicast data, a distance value between geographic locations of the transmitter and the receiver is taken as the target transmission distance value, or a target transmission distance value with respect to a target transmission loss is determined based on the target transmission loss for data transmission between the transmitter and the receiver.

At step 502, the transmitter calculates a target guard duration value corresponding to a guard period according to the target transmission distance value and a data transmission speed.

At step 503, the transmitter performs automatic gain control processing for target data starting from a first time point when the transmitter is to send data burst transmission.

The first time point is a time point having an interval of the target guard duration value from a start time point, and the starting time point is a time point at which the data burst transmission is determined to be performed.

At step 504, the transmitter sends the target data to the receiver in the Internet of Vehicles when the automatic gain control processing is completed.

At step 505, the receiver determines a second time point.

Optionally, when the receiver cannot determine the target guard duration value, the receiver may determine the second time point by performing sequentially energy detection in chronological order, or the receiver may set a reference time point and determine the second time point according to the reference time point.

At step 506, the receiver starts to perform automatic gain control processing at the second time point.

At step 507, the receiver receives the target data when the automatic gain control processing is completed.

In the example, the transmitter may determine the target guard duration value based on a target transmission distance value between the transmitter and the receiver, which is easy to implement and has high availability. The receiver may accurately determine the second time point for receiving the target data when the target guard duration value is not known. In the example, the guard period is placed before sending the target data, and a number of valid symbols in a subframe for data transmission may be increased by controlling the target guard duration value corresponding to the guard period. Thus, the performance loss of a terminal in the Internet of Vehicles is reduced, which is beneficial to the overall performance in the Internet of Vehicles.

Corresponding to the foregoing method examples for implementing application functions, the present disclosure further provides examples of apparatuses for implementing application functions, corresponding base stations and terminals.

Figure 19:
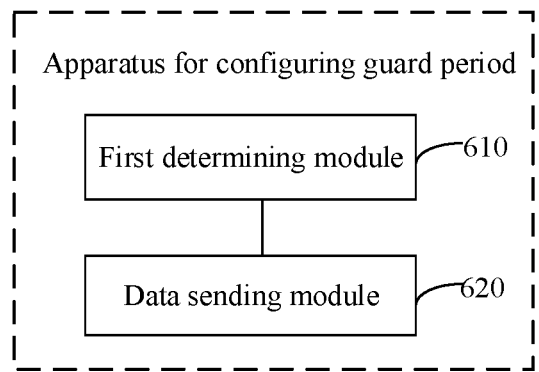
FIG. 19 is a block diagram illustrating an apparatus for configuring a guard period according to an example.

Referring to FIG. 19, which is a block diagram illustrating an apparatus for configuring a guard period according to an example. The apparatus can be used at a transmitter in Internet of Vehicles, and the apparatus includes the following.

A first determining module 610 is configured to determine a target guard duration value corresponding to a guard period.

A data sending module 620 is configured to send target data of data burst transmission to a receiver in the Internet of Vehicles starting from a first time point when the data burst transmission is to be performed.

The first time point is a time point having an interval of the target guard duration value from a start time point, and the start time point is a time point at which the data burst transmission is determined to be performed.

Figure 20:
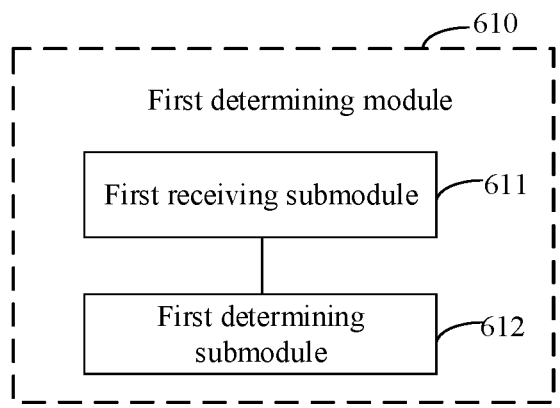
FIG. 20 is a block diagram illustrating another apparatus for configuring a guard period according to an example.

Referring to FIG. 20, which is a block diagram illustrating another apparatus for configuring a guard period based on the example shown in FIG. 19, the first determining module 610 includes the following.

A first receiving submodule 611 is configured to receive a first guard duration value configured by a base station in the Internet of Vehicles for the transmitter and sent by the base station through first preset signaling.

A first determining submodule 612 is configured to take the first guard duration value as the target guard duration value.

Figure 21:
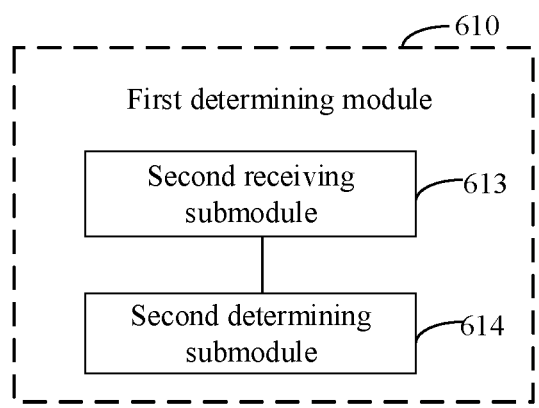
FIG. 21 is a block diagram illustrating another apparatus for configuring a guard period according to an example.

Referring to FIG. 21, which is a block diagram illustrating another apparatus for configuring a guard period based on the example shown in FIG. 19, the first determining module 610 includes the following.

A second receiving submodule 613 is configured to receive a first guard duration value configured by a base station in the Internet of Vehicles for the transmitter and sent by the base station through first preset signaling.

A second determining submodule 614 is configured to take the first guard duration value as the target guard duration value upon receiving second preset signaling for activating the first guard duration value from the base station.

Figure 22:
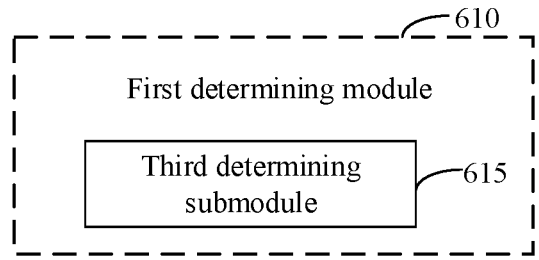
FIG. 22 is a block diagram illustrating another apparatus for configuring a guard period according to an example.

Referring to FIG. 22, which is a block diagram illustrating another apparatus for configuring a guard period based on the example shown in FIG. 19, the first determining module 610 includes the following.

A third determining submodule 615 is configured to determine the target guard duration value according to a pre-configuration of the transmitter.

Figure 23:
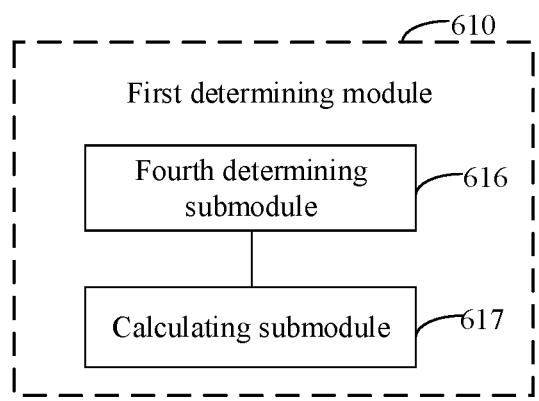
FIG. 23 is a block diagram illustrating another apparatus for configuring a guard period according to an example.

Referring to FIG. 23, which is a block diagram illustrating another apparatus for configuring a guard period based on the example shown in FIG. 19, the first determining module 610 includes the following.

A fourth determining submodule 616 is configured to determine a target transmission distance value between the transmitter and the receiver.

A calculating submodule 617 is configured to obtain the target guard duration value corresponding to the guard period according to the target transmission distance value and a data transmission speed.

Figure 24:
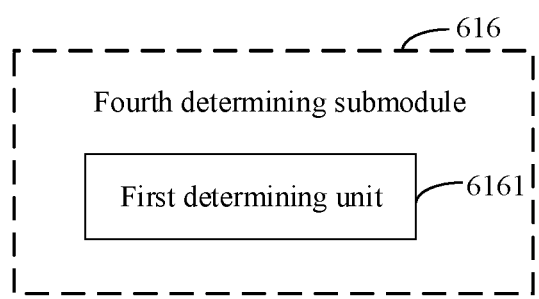
FIG. 24 is a block diagram illustrating another apparatus for configuring a guard period according to an example.

Referring to FIG. 24, which is a block diagram illustrating another apparatus for configuring a guard period based on the example shown in FIG. 23, the fourth determining submodule 616 includes the following.

A first determining unit 6161 is configured to take, if the target data is broadcast data, a maximum transmission distance value pre-configured for the Internet of Vehicles as the target transmission distance value.

Figure 25:
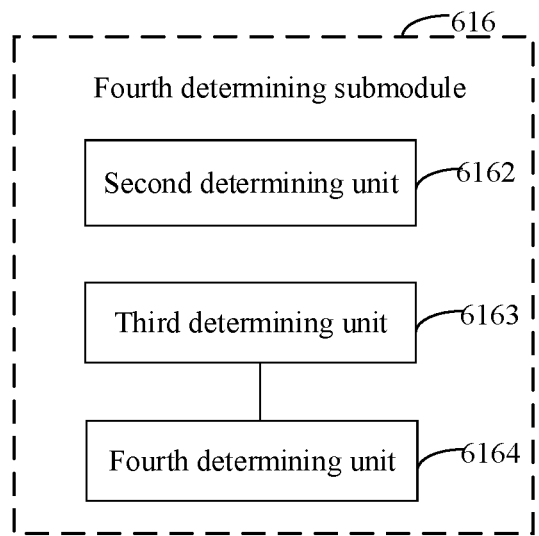
FIG. 25 is a block diagram illustrating another apparatus for configuring a guard period according to an example.

Referring to FIG. 25, which is a block diagram illustrating another apparatus for configuring a guard period based on the example shown in FIG. 23, the fourth determining submodule 616 includes a second determining unit 6162, or includes a third determining unit 6163 and a fourth determining unit 6164.

The second determining unit 6162 is configured to take, if the target data is unicast data, a distance value between geographic locations of the transmitter and the receiver as the target transmission distance value.

The third determining unit 6163 is configured to determine a target transmission loss for data transmission between the transmitter and the receiver.

The fourth determining unit 6164 is configured to determine the target transmission distance value with respect to the target transmission loss according to a pre-determined correspondence between transmission loss and transmission distance value.

Figure 26:
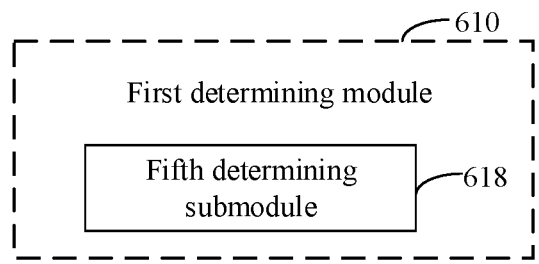
FIG. 26 is a block diagram illustrating another apparatus for configuring a guard period according to an example.

Referring to FIG. 26, which is a block diagram illustrating another apparatus for configuring a guard period based on the example shown in FIG. 19, the first determining module 610 includes the following.

A fifth determining submodule 618 is configured to take an integer multiple of a pre-determined duration unit value as the target guard duration value.

Optionally, the target guard duration value is a duration value corresponding to one symbol or half a symbol.

Figure 27:
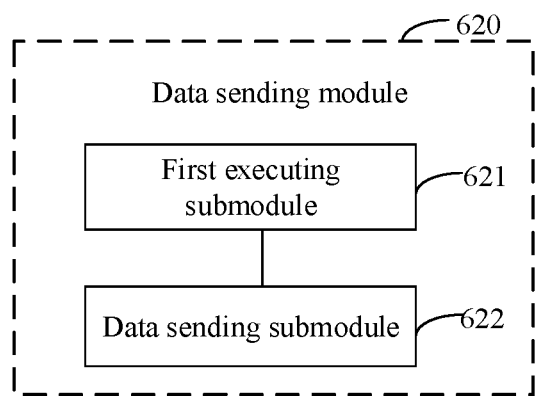
FIG. 27 is a block diagram illustrating another apparatus for configuring a guard period according to an example.

Referring to FIG. 27, which is a block diagram illustrating another apparatus for configuring a guard period based on the example shown in FIG. 19, the data sending module 620 includes the following.

A first executing submodule 621 is configured to perform automatic gain control processing for the target data starting from the first time point.

A data sending submodule 622 is configured to send the target data to the receiver in the Internet of Vehicles upon completing the automatic gain control processing.

Figure 28:
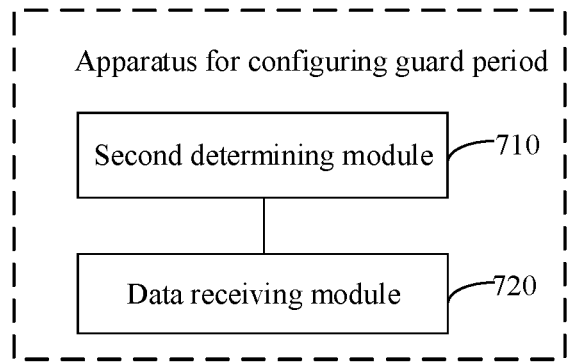
FIG. 28 is a block diagram illustrating another apparatus for configuring a guard period according to an example.

Referring to FIG. 28, which is a block diagram illustrating an apparatus for configuring a guard period according to an example. The apparatus can be used at a receiver in Internet of Vehicles, and the apparatus includes the following.

A second determining module 710 is configured to determine a second time point at which to start receiving target data. The target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter.

A data receiving module 720 is configured to receive the target data starting at the second time point.

Figure 29:
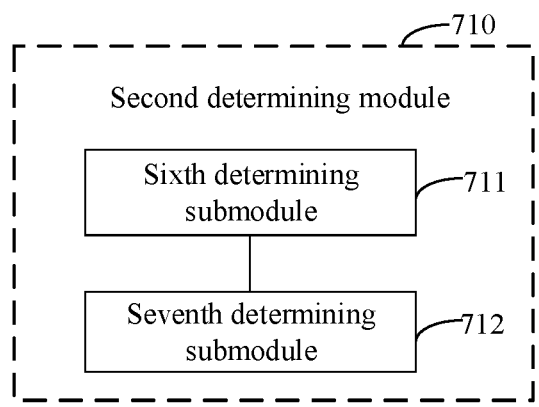
FIG. 29 is a block diagram illustrating another apparatus for configuring a guard period according to an example.

Referring to FIG. 29, which is a block diagram illustrating another apparatus for configuring a guard period based on the example shown in FIG. 28, the second determining module 710 includes the following.

A sixth determining submodule 711 is configured to determine the target guard duration value.

A seventh determining submodule 712 is configured to determine, in a current scheduling period, the second time point at which to start receiving the target data according to the target guard duration value.

Figure 30:
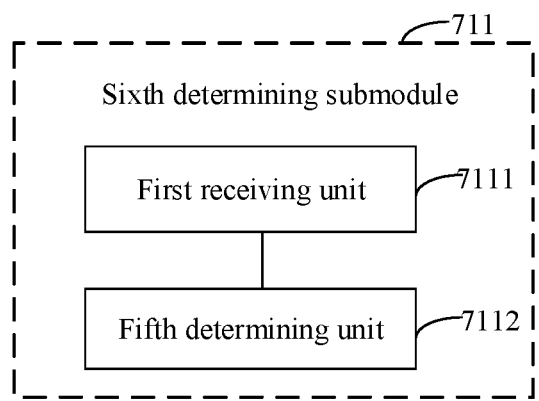
FIG. 30 is a block diagram illustrating another apparatus for configuring a guard period according to an example.

Referring to FIG. 30, which is a block diagram illustrating another apparatus for configuring a guard period based on the example shown in FIG. 29, the sixth determining submodule 711 includes the following.

A first receiving unit 7111 is configured to receive a first guard duration value configured by a base station for the transmitter and sent by the base station through first preset signaling.

A fifth determining unit 7112 is configured to take the first guard duration value as the target guard duration value.

Figure 31:
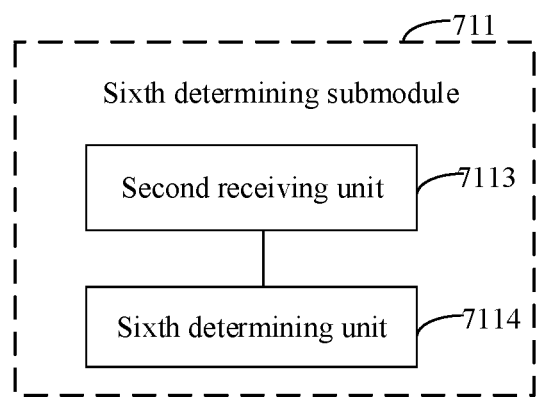
FIG. 31 is a block diagram illustrating another apparatus for configuring a guard period according to an example.

Referring to FIG. 31, which is a block diagram illustrating another apparatus for configuring a guard period based on the example shown in FIG. 29, the sixth determining submodule 711 includes the following.

A second receiving unit 7113 is configured to receive a second guard duration value sent from the transmitter to the receiver through broadcast signaling.

A sixth determining unit 7114 is configured to take the second guard duration value as the target guard duration value.

Figure 32:
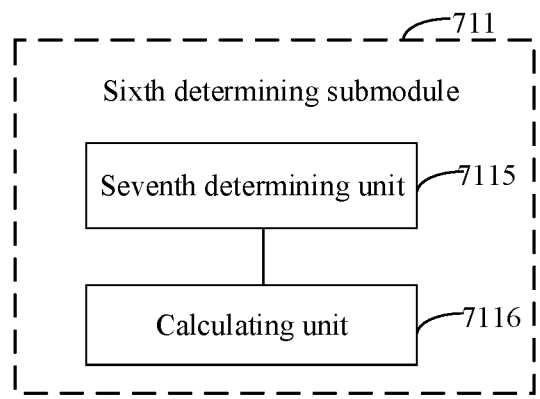
FIG. 32 is a block diagram illustrating another apparatus for configuring a guard period according to an example.

Referring to FIG. 32, which is a block diagram illustrating another apparatus for configuring a guard period based on the example shown in FIG. 29, the sixth determining submodule 711 includes the following.

A seventh determining unit 7115 is configured to determine a target transmission distance value between the receiver and the transmitter.

A calculating unit 7116 is configured to obtain the target guard duration value corresponding to the guard period associated with the transmitter according to the target transmission distance value and a data transmission speed.

Figure 33:
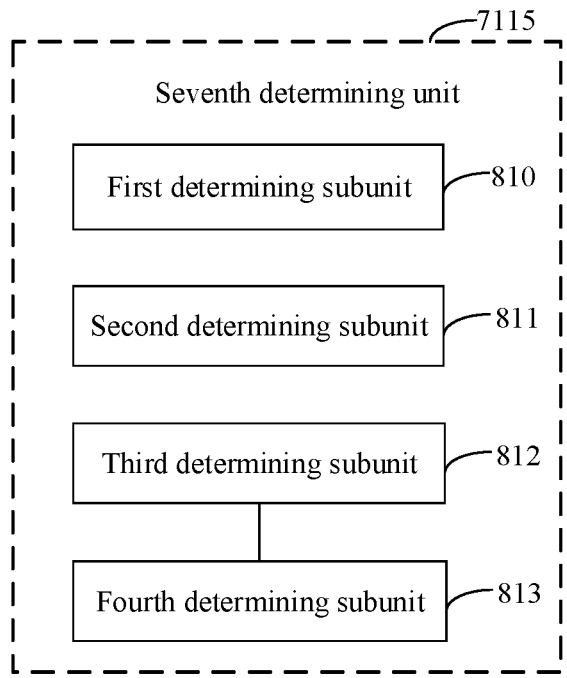
FIG. 33 is a block diagram illustrating another apparatus for configuring a guard period according to an example.

Referring to FIG. 33, which is a block diagram illustrating another apparatus for configuring a guard period based on the example shown in FIG. 32, the seventh determining unit 7115 includes a first determining subunit 810, or includes a second determining subunit 811, or includes a third determining subunit 812 and a fourth determining subunit 813.

The first determining subunit 810 is configured to take a maximum transmission distance value pre-configured for the Internet of Vehicles as the target transmission distance value.

The second determining subunit 811 is configured to take a distance value between geographic locations of the receiver and the transmitter as the target transmission distance value.

The third determining subunit 812 is configured to determine a target data transmission loss for data transmission between the receiver and the transmitter.

The fourth determining subunit 813 is configured to determine the target transmission distance value with respect to the target transmission loss according to a pre-determined correspondence between transmission loss and transmission distance value.

Figure 34:
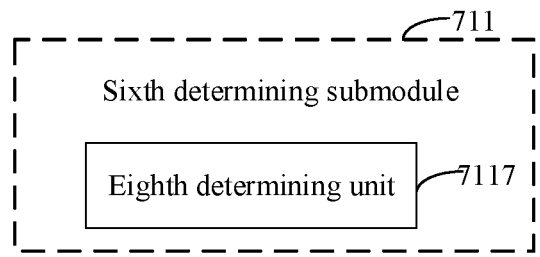
FIG. 34 is a block diagram illustrating another apparatus for configuring a guard period according to an example.

Referring to FIG. 34, which is a block diagram illustrating another apparatus for configuring a guard period based on the example shown in FIG. 29, the sixth determining submodule 711 includes the following.

An eighth determining unit 7117 is configured to determine the target guard duration value according to a pre-configuration of the receiver.

Figure 35:
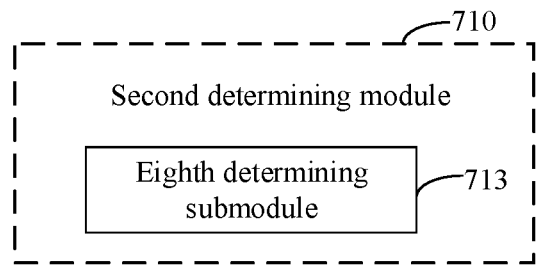
FIG. 35 is a block diagram illustrating another apparatus for configuring a guard period according to an example.

Referring to FIG. 35, which is a block diagram illustrating another apparatus for configuring a guard period based on the example shown in FIG. 29, the second determining module 710 includes the following.

An eighth determining submodule 713 is configured to perform energy detection at a plurality of time points within a current scheduling period in chronological order, and take a time point with an energy value greater than a preset threshold as the second time point.

Figure 36:
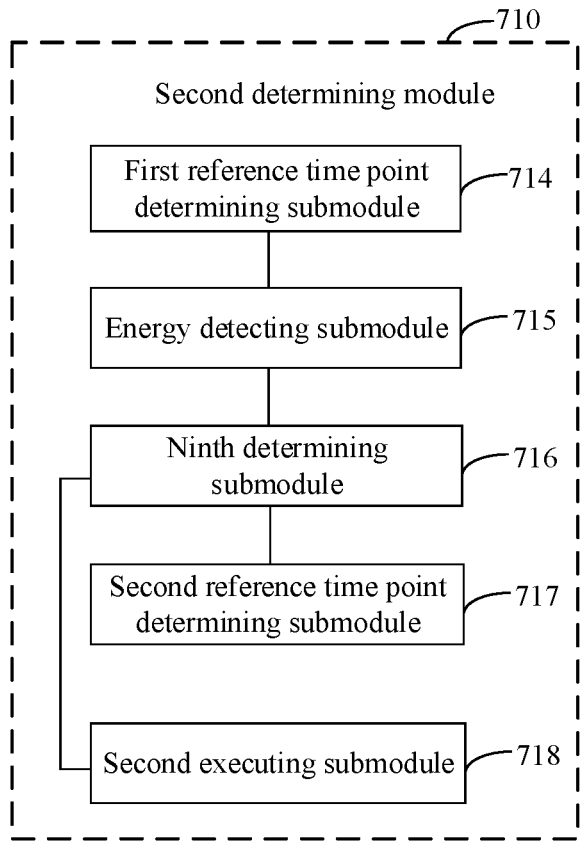
FIG. 36 is a block diagram illustrating another apparatus for configuring a guard period according to an example.

Referring to FIG. 36, which is a block diagram illustrating another apparatus for configuring a guard period based on the example shown in FIG. 29, the second determining module 710 includes the following.

A first reference time point determining submodule 714 is configured to determine a reference time point in a current scheduling period.

An energy detecting submodule 715 is configured to perform energy detection within a first time period of a preset duration value before the reference time point, and perform energy detection within a second time period of the preset duration value after the reference time point.

A ninth determining submodule 716 is configured to take the reference time point as the second time point if an energy value within the second time period is greater than an energy value within the first time period.

A second reference time point determining submodule 717 is configured to select a time point before the reference time point as a new reference time point if the energy value within the second time period is less than the energy value within the first time period.

A second executing submodule 718 is configured to repeatedly perform energy detection within a first time period of the preset time length value before the reference time point, and perform energy detection within a second time period of the preset time length value after the reference time point, until the second time point is determined.

Figure 37:
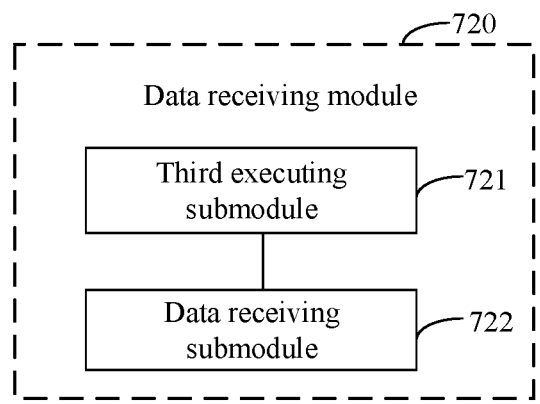
FIG. 37 is a block diagram illustrating another apparatus for configuring a guard period according to an example.

Referring to FIG. 37, which is a block diagram illustrating another apparatus for configuring a guard period based on the example shown in FIG. 29, the data receiving module 720 includes the following.

A third executing submodule 721 is configured to start automatic gain control processing from the second time point.

A data receiving submodule 722 is configured to receive the target data upon completing the automatic gain control processing.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, the present disclosure also provides a computer-readable storage medium, the storage medium stores a computer program, and the computer program is configured to perform any one of the methods of configuring a guard period for a transmitter in Internet of Vehicles as described above.

Correspondingly, the present disclosure also provides a computer-readable storage medium, the storage medium stores a computer program, and the computer program is configured to perform any one of the methods of configuring a guard period for a receiver in Internet of Vehicles as described above.

Correspondingly, the present disclosure also provides an apparatus for configuring a guard period. The apparatus can be used at a transmitter in Internet of Vehicles, and the apparatus includes:

a processor, and memory for storing instructions executable by the processor, where the processor is configured to:

determine a target guard duration value corresponding to a guard period; and when data burst transmission is to be performed, send target data of the data burst transmission to a receiver in the Internet of Vehicles starting from a first time point, where the first time point is a time point having an interval of the target guard duration value from a start time point, and the start time point is a time point at which the data burst transmission is determined to be performed.

Figure 38:
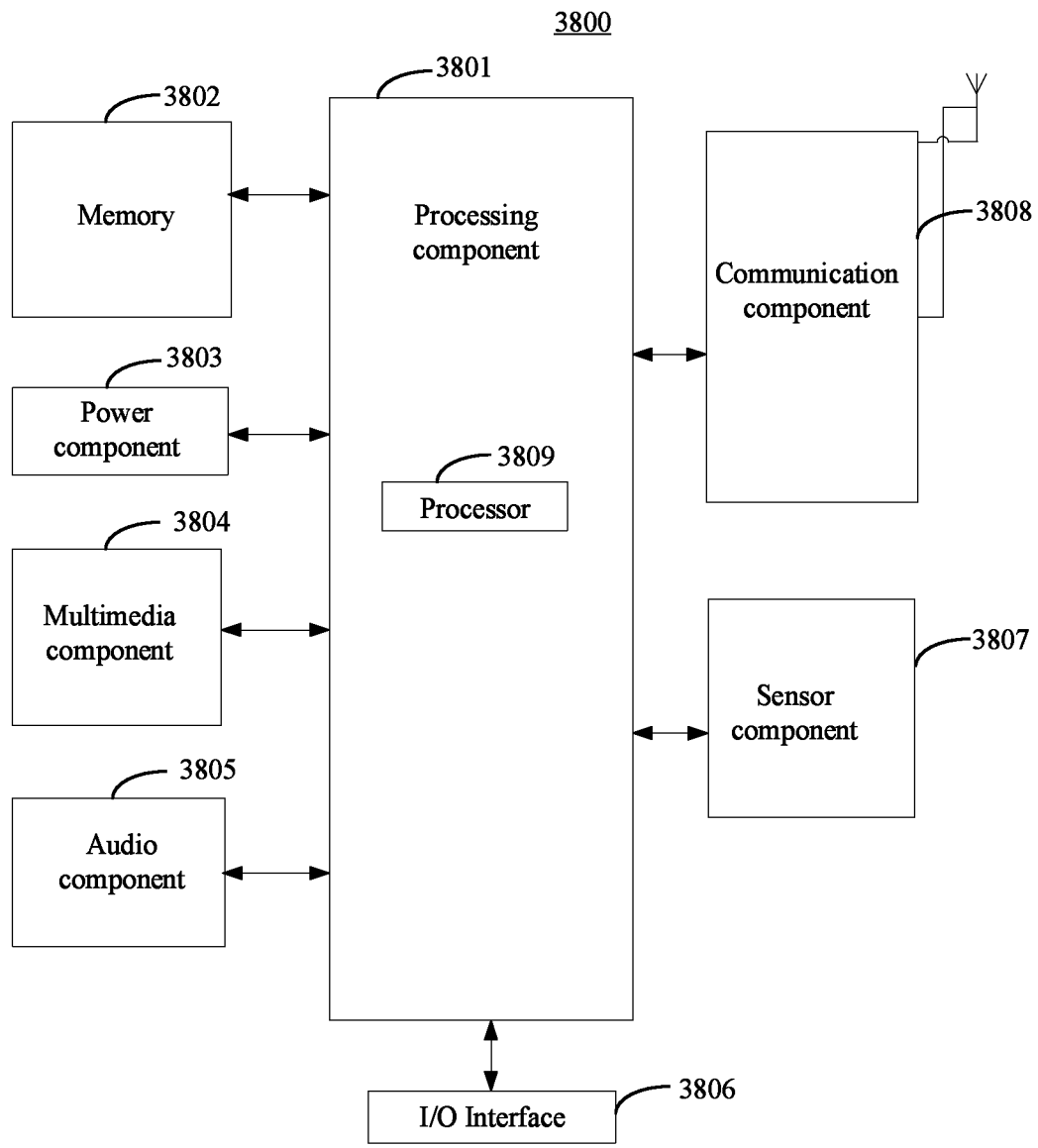
FIG. 38 is a structural schematic diagram illustrating an apparatus for configuring a guard period according to an example of the present disclosure.

FIG. 38 is a schematic structural diagram illustrating an apparatus for configuring a guard period according to an example. As shown in FIG. 38, an apparatus 3800 for configuring a guard period is illustrated according to an example. The apparatus 3800 may be a transmitter in Internet of Vehicles, such as a mobile phone, a computer, a digital broadcast terminal, a messaging device, a game console, a tablet device, a medical equipment, a fitness equipment, a personal digital assistant, or other terminals.

Referring to FIG. 38, the apparatus 3800 may include one or more of the following components: a processing component 3801, memory 3802, a power component 3803, a multimedia component 3804, an audio component 3805, an input/output (I/O) interface 3806, a sensor component 3807, and a communication component 3808.

The processing component 3801 usually controls the overall operation of the apparatus 3800, such as operations associated with display, telephone calls, data communications, camera operations, and recording operations. The processing component 3801 may include one or more processors 3809 to execute instructions to perform all or part of the steps in the methods described above. Moreover, the processing component 3801 may include one or more modules to facilitate interaction between the processing component 3801 and other components. For example, the processing component 3801 may include a multimedia module to facilitate interaction between the multimedia component 3804 and the processing component 3801.

The memory 3802 is configured to store various types of data to support operation at the apparatus 3800. Examples of these data include instructions for any application or method operating at the apparatus 3800, contact data, phone book data, messages, pictures, videos, and the like. The memory 3802 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power component 3803 provides power to various components of the apparatus 3800. The power component 3803 may include a power management system, one or more power sources, and other components associated with power generated, managed, and distributed for the apparatus 3800.

The multimedia component 3804 includes a screen that provides an output interface between the apparatus 3800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 3804 includes a front camera and/or a rear camera. When the apparatus 3800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 3805 is configured to output and/or input audio signals. For example, the audio component 3805 includes a microphone (MIC) configured to receive an external audio signal when the apparatus 3800 is in an operation mode, such as a call mode, a recording mode, and a voice recognition mode. The received audio signal may be further stored in the memory 3802 or transmitted via the communication component 3808. In some examples, the audio component 3805 also includes a loudspeaker for outputting an audio signal.

The I/O interface 3806 provides an interface between the processing component 3801 and a peripheral interface module which may be a keyboard, a click wheel, a button, or the like. These buttons may include, but are not limited to a home button, a volume button, a start button, and a lock button.

The sensor component 3807 includes one or more sensors for providing a status assessment in various aspects to the apparatus 3800. For example, the sensor component 3807 may detect an open/closed state of the apparatus 3800, and the relative positioning of components, for example, the component is a display and a keypad of the apparatus 3800. The sensor component 3807 may also detect a change in position of the apparatus 3800 or a component of the apparatus 3800, the presence or absence of a user in contact with the apparatus 3800, the orientation or acceleration/deceleration of the apparatus 3800 and a change in temperature of the apparatus 3800. The sensor component 3807 may include a proximity sensor configured to detect the presence of nearby objects without any physical contact. The sensor component 3807 may also include a light sensor, such as a CMOS or CCD image sensor, for use in imaging applications. In some examples, the sensor component 3807 may also include an acceleration sensor, a gyro sensor, a magnetic sensor, a pressure sensor, or a temperature sensor.

The communication component 3808 is configured to facilitate wired or wireless communication between the apparatus 3800 and other devices. The apparatus 3800 may access a wireless network based on a communication standard, such as Wi-Fi, 2G or 3G, or a combination thereof. In an example, the communication component 3808 receives broadcast signals or broadcast associated information from an external broadcast management system via a broadcast channel. In an example, the communication component 3808 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 3800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an example, there is also provided a non-transitory computer readable storage medium including instructions, such as memory 3802 including instructions, where the instructions are executable by the processor 3809 of the apparatus 3800 to perform the method as described above. For example, the non-transitory computer readable storage medium may be a ROM, a random access memory (RAM), a CD-ROM, a magnetic tape, a floppy disk, an optical data storage device, and so on.

When the instructions in the storage medium are executed by the processor, the apparatus 3800 is enabled to execute any of the foregoing methods of configuring a guard period for the transmitter in the Internet of Vehicles.

Correspondingly, the present disclosure also provides an apparatus for configuring a guard period. The apparatus can be used at a receiver in Internet of Vehicles, and the apparatus includes:
a processor, and
memory for storing instructions executable by the processor,
where the processor is configured to:
determine a second time point at which to start receiving target data, where the target data is data that a transmitter in the Internet of Vehicles sends to the receiver starting from a first time point, the first time point is a time point having an interval of a target guard duration value from a start time point, the starting time point is a time point at which a data burst transmission is determined to be performed, and the target guard duration value is a target guard duration value corresponding to a guard period associated with the transmitter; and
receive the target data starting at the second time point.

Figure 39:
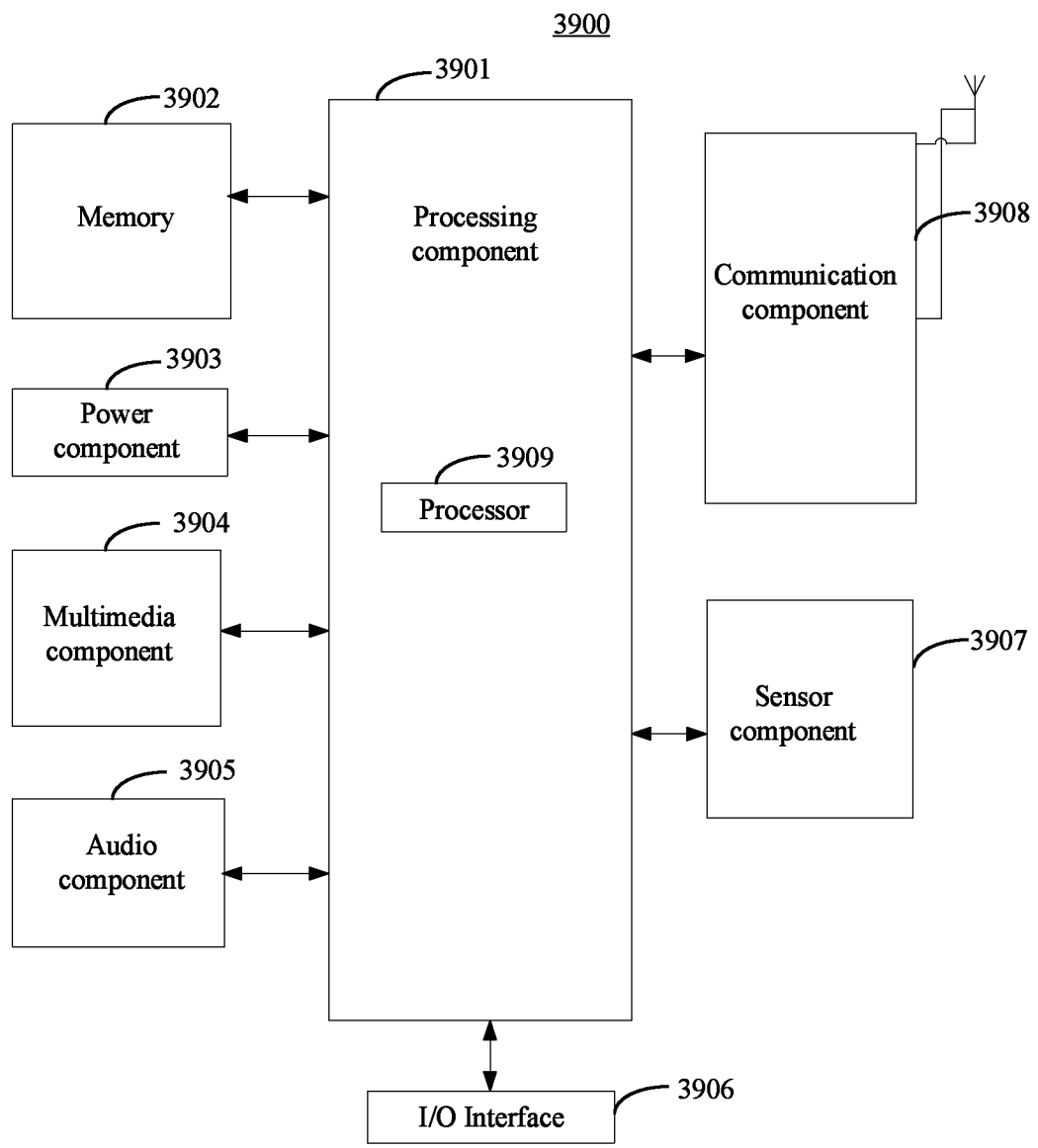
FIG. 39 is a structural schematic diagram illustrating another apparatus for configuring a guard period according to an example of the present disclosure.

FIG. 39 is a schematic structural diagram illustrating another apparatus for configuring a guard period according to an example. As shown in FIG. 39, another apparatus 3900 for configuring a guard period is illustrated according to an example. The apparatus 3900 may be a receiver in Internet of Vehicles, such as a computer, a mobile phone, a digital broadcast terminal, a messaging device, a game console, a tablet device, a medical equipment, a fitness equipment, a personal digital assistant, or other terminals.

Referring to FIG. 39, the apparatus 3900 may include one or more of the following components: a processing component 3901, memory 3902, a power component 3903, a multimedia component 3904, an audio component 3905, an input/output (I/O) interface 3906, a sensor component 3907, and a communication component 3908.

The processing component 3901 usually controls the overall operation of the apparatus 3900, such as operations associated with display, telephone calls, data communications, camera operations, and recording operations. The processing component 3901 may include one or more processors 3909 to execute instructions to perform all or part of the steps in the methods described above. Moreover, the processing component 3901 may include one or more modules to facilitate interaction between the processing component 3901 and other components. For example, the processing component 3901 may include a multimedia module to facilitate interaction between the multimedia component 3904 and the processing component 3901.

The memory 3902 is configured to store various types of data to support operation at the apparatus 3900. Examples of these data include instructions for any application or method operating at the apparatus 3900, contact data, phone book data, messages, pictures, videos, and the like. The memory 3902 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power component 3903 provides power to various components of the apparatus 3900. The power component 3903 may include a power management system, one or more power sources, and other components associated with power generated, managed, and distributed for the apparatus 3900.

The multimedia component 3904 includes a screen that provides an output interface between the apparatus 3900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 3904 includes a front camera and/or a rear camera. When the apparatus 3900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 3905 is configured to output and/or input audio signals. For example, the audio component 3905 includes a microphone (MIC) configured to receive an external audio signal when the apparatus 3900 is in an operation mode, such as a call mode, a recording mode, and a voice recognition mode. The received audio signal may be further stored in the memory 3902 or transmitted via the communication component 3908. In some examples, the audio component 3905 also includes a loudspeaker for outputting an audio signal.

The I/O interface 3906 provides an interface between the processing component 3901 and a peripheral interface module which may be a keyboard, a click wheel, a button, or the like. These buttons may include, but are not limited to a home button, a volume button, a start button, and a lock button.

The sensor component 3907 includes one or more sensors for providing a status assessment in various aspects to the apparatus 3900. For example, the sensor component 3907 may detect an open/closed state of the apparatus 3900, and the relative positioning of components, for example, the component is a display and a keypad of the apparatus 3900. The sensor component 3907 may also detect a change in position of the apparatus 3900 or a component of the apparatus 3900, the presence or absence of a user in contact with the apparatus 3900, the orientation or acceleration/deceleration of the apparatus 3900 and a change in temperature of the apparatus 3900. The sensor component 3907 may include a proximity sensor configured to detect the presence of nearby objects without any physical contact. The sensor component 3907 may also include a light sensor, such as a CMOS or CCD image sensor, for use in imaging applications. In some examples, the sensor component 3907 may also include an acceleration sensor, a gyro sensor, a magnetic sensor, a pressure sensor, or a temperature sensor.

The communication component 3908 is configured to facilitate wired or wireless communication between the apparatus 3900 and other devices. The apparatus 3900 may access a wireless network based on a communication standard, such as Wi-Fi, 2G or 3G, or a combination thereof. In an example, the communication component 3908 receives broadcast signals or broadcast associated information from an external broadcast management system via a broadcast channel. In an example, the communication component 3908 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 3900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an example, there is also provided a non-transitory computer readable storage medium including instructions, such as memory 3902 including instructions, where the instructions are executable by the processor 3909 of the apparatus 3900 to perform the method as described above. For example, the non-transitory computer readable storage medium may be a ROM, a random-access memory (RAM), a CD-ROM, a magnetic tape, a floppy disk, an optical data storage device, and so on.

When the instructions in the storage medium are executed by the processor, the apparatus 3900 is enabled to execute any of the foregoing methods of configuring a guard period for the receiver in the Internet of Vehicles.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of configuring a guard period, for a transmitter in Internet of Vehicles, and comprising:
   determining a target guard duration value corresponding to a guard period; and
   when data burst transmission is to be performed, sending target data of the data burst transmission to a receiver in the Internet of Vehicles starting from a first time point,
   wherein the first time point is a time point having an interval of the target guard duration value from a start time point, and the start time point is a time point at which the data burst transmission is determined to be performed,
   wherein the determining the target guard duration value corresponding to the guard period comprises:
      determining a target transmission distance value between the transmitter and the receiver; and
      obtaining the target guard duration value corresponding to the guard period according to the target transmission distance value and a data transmission speed.

2. The method according to claim 1, wherein the determining the target guard duration value corresponding to the guard period comprises:
   receiving a first guard duration value configured by a base station in the Internet of Vehicles for the transmitter and sent by the base station through first preset signaling; and
   taking the first guard duration value as the target guard duration value.

3. The method according to claim 1, wherein the determining the target guard duration value corresponding to the guard period comprises:
   receiving a first guard duration value configured by a base station in the Internet of Vehicles for the transmitter and sent by the base station through first preset signaling; and
   upon receiving second preset signaling for activating the first guard duration value from the base station, taking the first guard duration value as the target guard duration value.

4. The method according to claim 1, wherein the determining the target guard duration value corresponding to the guard period comprises:
   determining the target guard duration value according to a pre-configuration of the transmitter.

5. The method according to claim 1, wherein the determining the target transmission distance value between the transmitter and the receiver comprises:
in response to determining that the target data is broadcast data, taking a maximum transmission distance value pre-configured for the Internet of Vehicles as the target transmission distance value.

6. The method according to claim 1, wherein the determining the target transmission distance value between the transmitter and the receiver comprises:
in response to determining that the target data is unicast data,
taking a distance value between geographic locations of the transmitter and the receiver as the target transmission distance value; or
determining a target transmission loss for data transmission between the transmitter and the receiver; and determining the target transmission distance value with respect to the target transmission loss according to a pre-determined correspondence between the transmission loss and the transmission distance value.

7. The method according to claim 1, wherein the determining the target guard duration value corresponding to the guard period comprises:
taking an integer multiple of a pre-determined duration unit value as the target guard duration value.

8. The method according to claim 1, wherein the sending the target data of the data burst transmission to the receiver in the Internet of Vehicles starting from the first time point comprises:
performing automatic gain control processing for the target data starting from the first time point; and
upon completing the automatic gain control processing, sending the target data to the receiver in the Internet of Vehicles.

9. A method of configuring a guard period, applicable to a receiver in Internet of Vehicles, and comprising:
determining a second time point at which to start receiving target data, wherein
the target data is data that a transmitter in the Internet of Vehicles sends to the receiver starting from a first time point;
the first time point is a time point having an interval of a target guard duration value from a start time point;
the starting time point is a time point at which a data burst transmission is determined to be performed;
the target guard duration value is a target guard duration value corresponding to a guard period associated with the transmitter; and
receiving the target data starting at the second time point;
wherein the determining the second time point at which to start receiving the target data comprises:
determining the target guard duration value; and
in a current scheduling period, determining the second time point at which to start receiving the target data according to the target guard duration value;
wherein the determining the target guard duration value comprises:
determining a target transmission distance value between the receiver and the transmitter; and
obtaining the target guard duration value corresponding to the guard period associated with the transmitter according to the target transmission distance value and a data transmission speed.

10. The method according to claim 9, wherein the determining the target guard duration value comprises:
receiving a first guard duration value configured by a base station for the transmitter and sent by the base station through first preset signaling; and
taking the first guard duration value as the target guard duration value.

11. The method according to claim 9, wherein the determining the target guard duration value comprises:
receiving a second guard duration value sent from the transmitter to the receiver through broadcast signaling; and
taking the second guard duration value as the target guard duration value.

12. The method according to claim 11, wherein the determining the target transmission distance value between the receiver and the transmitter comprises:
taking a maximum transmission distance value pre-configured for the Internet of Vehicles as the target transmission distance value; or
taking a distance value between geographic locations of the receiver and the transmitter as the target transmission distance value; or
determining a target data transmission loss for data transmission between the receiver and the transmitter; and determining the target transmission distance value with respect to the target transmission loss according to a pre-determined correspondence between the transmission loss and the transmission distance value.

13. The method according to claim 9, wherein the determining the second time point at which to start receiving the target data comprises:
performing energy detection at a plurality of time points within a current scheduling period in chronological order; and
taking a time point with an energy value greater than a preset threshold as the second time point.

14. The method according to claim 9, wherein the determining the second time point at which to start receiving the target data comprises:
determining a reference time point in a current scheduling period;
performing energy detection within a first time period of a preset duration value before the reference time point, and performing energy detection within a second time period of the preset duration value after the reference time point;
in response to determining that an energy value within the second time period is greater than an energy value within the first time period, taking the reference time point as the second time point;
in response to determining that the energy value within the second time period is less than or equal to the energy value within the first time period, selecting a time point before the reference time point as a new reference time point; and
repeatedly performing energy detection within a first time period of the preset time length value before the new reference time point, and performing energy detection within a second time period of the preset time length value after the new reference time point, until the second time point is determined.

15. The method according to claim 9, wherein the receiving the target data starting at the second time point comprises:
starting automatic gain control processing from the second time point; and
upon completing the automatic gain control processing, receiving the target data.

16. An apparatus for configuring a guard period for a transmitter in Internet of Vehicles, and comprising:
   a processor, and
   memory for storing instructions executable by the processor,
   wherein the processor is configured to:
      determine a target guard duration value corresponding to a guard period; and
      when data burst transmission is to be performed, send target data of the data burst transmission to a receiver in the Internet of Vehicles starting from a first time point,
   wherein the first time point is a time point having an interval of the target guard duration value from a start time point, and the start time point is a time point at which the data burst transmission is determined to be performed;
   wherein the determining the target guard duration value corresponding to the guard period comprises:
      determining a target transmission distance value between the transmitter and the receiver; and
      obtaining the target guard duration value corresponding to the guard period according to the target transmission distance value and a data transmission speed.

17. An apparatus implementing the method according to claim 9, comprising:
   a processor, and
   memory for storing instructions executable by the processor,
   wherein the processor is configured to implement the steps of claim 9.

* * * * *